US011573732B2

(12) United States Patent
Kim et al.

(10) Patent No.: US 11,573,732 B2
(45) Date of Patent: Feb. 7, 2023

(54) STORAGE DEVICE, MEMORY SYSTEM COMPRISING THE SAME, AND OPERATION METHOD THEREOF

(71) Applicant: SAMSUNG ELECTRONICS CO., LTD., Suwon-si (KR)

(72) Inventors: Dong-Woo Kim, Suwon-si (KR); Songho Yoon, Yongin-si (KR); Jeong-Woo Park, Hwaseong-si (KR); Dong-Min Kim, Hwaseong-si (KR); Kyoung Back Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 16/901,332

(22) Filed: Jun. 15, 2020

(65) Prior Publication Data

US 2021/0034285 A1 Feb. 4, 2021

(30) Foreign Application Priority Data

Aug. 1, 2019 (KR) .......................... 10-2019-0094002

(51) Int. Cl.
*G06F 3/06* (2006.01)

(52) U.S. Cl.
CPC .......... *G06F 3/0656* (2013.01); *G06F 3/0614* (2013.01); *G06F 3/0622* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,507,722 B2 | 11/2016 | Desai et al. | |
| 9,507,723 B2 | 11/2016 | Lin et al. | |
| 9,563,382 B2 | 2/2017 | Hahn et al. | |
| 9,836,243 B1 | 12/2017 | Chanler et al. | |
| 9,858,008 B2 | 1/2018 | Liu et al. | |
| 2005/0240696 A1* | 10/2005 | Hasegawa ........... | G06F 13/4291 710/105 |
| 2011/0233648 A1 | 9/2011 | Seol | |
| 2016/0011790 A1 | 1/2016 | Rostoker et al. | |
| 2017/0091243 A1* | 3/2017 | Cheru ..................... | G06F 13/28 |
| 2017/0123979 A1 | 5/2017 | V et al. | |

(Continued)

OTHER PUBLICATIONS

Wookhan Jeong et al., "Improving Flash Storage Performance by Caching Address Mapping Table in Host Memory" Jul. 11, 2017, Slides presented at USENIX Hotstorage by Joo-Young Hwang.

(Continued)

*Primary Examiner* — Charles Rones
*Assistant Examiner* — Jonah C Krieger
(74) *Attorney, Agent, or Firm* — F. Chau & Associates, LLC

(57) ABSTRACT

A memory system includes a storage device including a turbo write buffer and a user storage area implemented with a nonvolatile memory, and a host configured to transfer a read request to the storage device. In response to the read request, the storage device transfers read data and read data information including attributes of the read data to the host.

14 Claims, 27 Drawing Sheets

(56) References Cited

U.S. PATENT DOCUMENTS

| | | |
|---|---|---|
| 2017/0351452 A1 | 12/2017 | Boyd et al. |
| 2018/0039578 A1 | 2/2018 | Yun et al. |
| 2018/0081569 A1* | 3/2018 | Kan ....................... G06F 11/34 |
| 2019/0114218 A1 | 4/2019 | Yun et al. |
| 2020/0278797 A1* | 9/2020 | Bavishi ................. G06F 3/0659 |
| 2021/0011842 A1* | 1/2021 | Lee ..................... G06F 12/0607 |

OTHER PUBLICATIONS

Wookhan Jeong et al., "Improving Flash Storage Performance by Caching Address Mapping Table in Host Memory", Jul. 11, 2017, White Paper Corresponding to Slides presented at USENIX Hotstorage by Joo-Young Hwang.

* cited by examiner

FIG. 14

| | 0 | 1 | 2 | 3 |
|---|---|---|---|---|
| | \\\\Response UPIU\\\\ | | | |
| | 4 | 5 | 6 | 7 |
| | | Read Data Info. | | |
| | 8 | 9 | 10 | 11 |
| | ... | ... | ... | ... |
| | Header E2ECRC (Omit if HD=0) | | | |
| k | Sense Data Length | k+1 | k+2 | k+3 |
| | | Sense Data[0] | Sense Data[1] | |
| | ... | ... | ... | ... |
| k+16 | Sense Data[14] | k+17 Sense Data[15] | k+2 Sense Data[16] | k+3 Sense Data[17] |
| | Data E2ECRC (Omit if HD=0) | | | |
| | Note 1 K =32 if HD=0 | | | |

FIG. 16

RDIe

| Byte | Extended Read Data Info. |
|------|--------------------------|
| 0~3  | LBA                      |
| 4    | Count                    |
| 5    | Hit rate(0~100%) on TWB-p |
| 6    | Hit rate(0~100%) on TWB-np |
| 7    | Reserved                 |

STORAGE DEVICE, MEMORY SYSTEM COMPRISING THE SAME, AND OPERATION METHOD THEREOF

CROSS-REFERENCE TO RELATED APPLICATION

This application claims priority under 35 U.S.C. § 119 to Korean Patent Application No. 10-2019-0094002, filed on Aug. 1, 2019 in the Korean Intellectual Property Office, the disclosure of which is incorporated by reference herein in its entirety.

TECHNICAL FIELD

Exemplary embodiments of the inventive concept described herein relate to a semiconductor memory device, and more particularly, relate to a storage device outputting data information in response to a read request and a response transfer method of the storage device.

DISCUSSION OF RELATED ART

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

Flash memory device have been widely used as high-capacity storage media in computing devices. Nowadays, various technologies for supporting high-speed operation of flash memory devices are being developed. For example, a universal flash storage (UFS) interface defined by the JEDEC standard may support a higher operating speed than a conventional flash memory-based storage device.

SUMMARY

According to an exemplary embodiment of the inventive concept, a memory system includes a storage device including a turbo write buffer and a user storage area implemented with a nonvolatile memory, and a host configured to transfer a read request to the storage device. In response to the read request, the storage device transfers read data and read data information including attributes of the read data to the host.

According to an exemplary embodiment of the inventive concept, an operation method of a memory system which includes a turbo write buffer and a user storage area implemented with a nonvolatile memory includes receiving a read request from a host, reading read data from the turbo write buffer or the user storage area in response to the read request, transferring the read data to the host by using a data transfer packet, and transferring read data information including location information of the read data to the host.

According to an exemplary embodiment of the inventive concept, a storage device configured to communicate with a host by using a universal flash storage (UFS) interface includes a nonvolatile memory device including a turbo write buffer area and a user storage area, and a memory controller configured to read read data from the nonvolatile memory device in response to a read request from the host, to load attribute information about the read data on a response packet, and to transfer the response packet to the host.

According to an exemplary embodiment of the inventive concept, for an operation method of a storage system including a host and a storage device, the storage device includes a turbo write buffer and a user storage area implemented with a nonvolatile memory, and the turbo write buffer includes a pinned turbo write buffer and a non-pinned turbo write buffer. The operation method includes receiving, by the storage device, a read request from a host, reading, by the storage device, read data from at least one of the pinned turbo write buffer, the non-pinned turbo write buffer, and the user storage area in response to the read request, transferring, by the storage device, the read data to the host by using a data transfer packet, and transferring, by the storage device, read data information to the host. The read data information indicates location information and feedback information of the read data. The pinned turbo write buffer is an area in which stored data are prohibited from moving to the user storage area. The non-pinned turbo write buffer is an area in which stored data are allowed to move to the user storage area.

BRIEF DESCRIPTION OF THE FIGURES

The above and other objects and features of the inventive concept will become apparent by describing in detail exemplary embodiments thereof with reference to the accompanying drawings.

FIG. 14 illustrates a method for transferring additional information through a response, according to an exemplary embodiment of the inventive concept.

FIG. 16 is a table illustrating extended read data information described with reference to FIG. 15 according to an exemplary embodiment of the inventive concept.

DETAILED DESCRIPTION OF THE EMBODIMENTS

Figure 1:
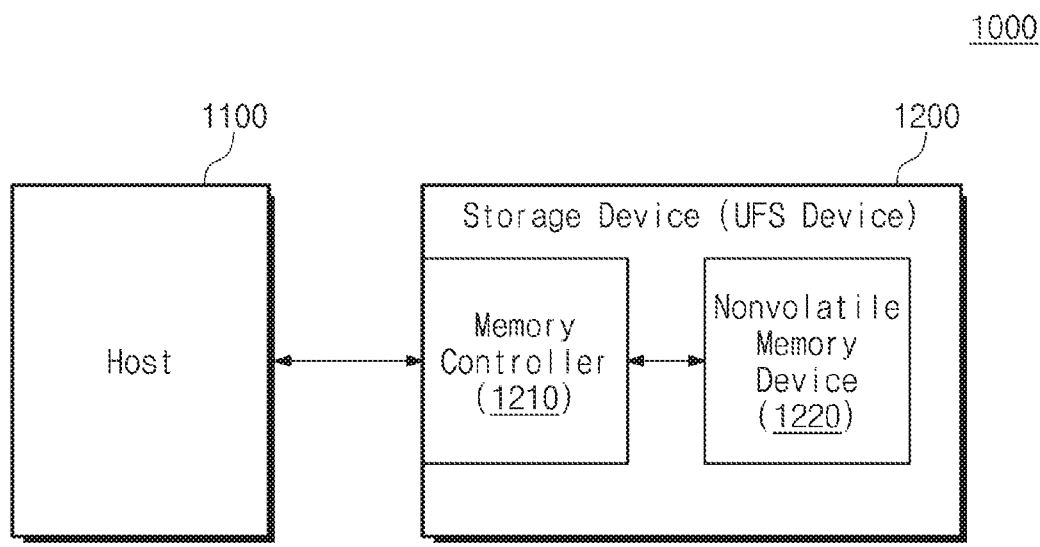
FIG. 1 is a block diagram illustrating a storage system according to an exemplary embodiment of the inventive concept.

Exemplary embodiments of the inventive concept provide a memory system that provides area information or hit/miss information about data read in a read operation of a storage device therein using a turbo write buffer and an operation method thereof.

Below, exemplary embodiments of the inventive concept will be described in detail with reference to the accompanying drawings. Like reference numerals may refer to like elements throughout this application.

FIG. 1 is a block diagram illustrating a storage system according to an exemplary embodiment of the inventive concept. Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function may be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
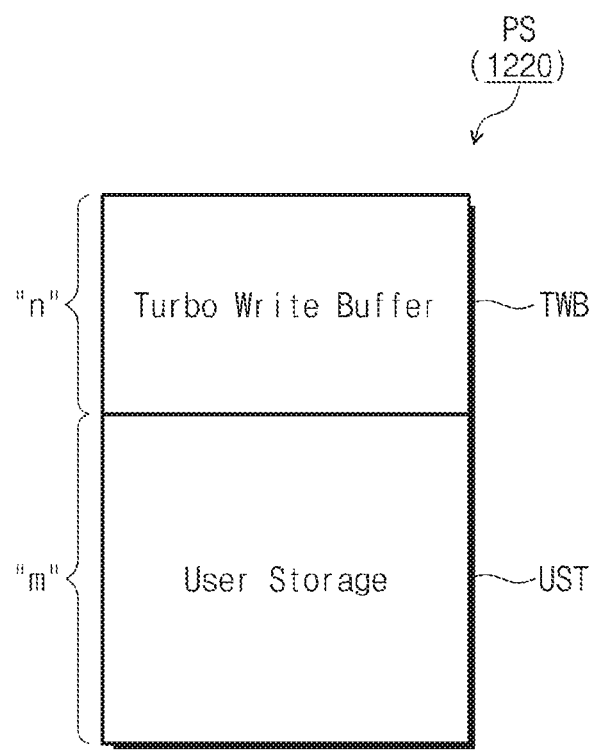
FIG. 2 is a diagram illustrating a physical storage space of a storage device of FIG. 1 according to an exemplary embodiment of the inventive concept.

FIG. 2 is a diagram illustrating a physical storage space PS of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 3A:
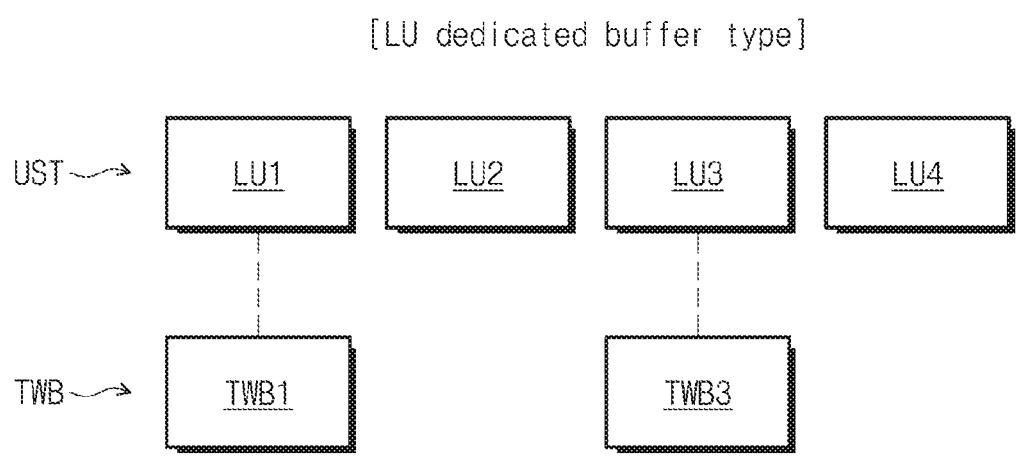
FIGS. 3A and 3B are diagrams for describing a turbo write buffer type of FIG. 2 according to exemplary embodiments of the inventive concept.
Figure 3B:
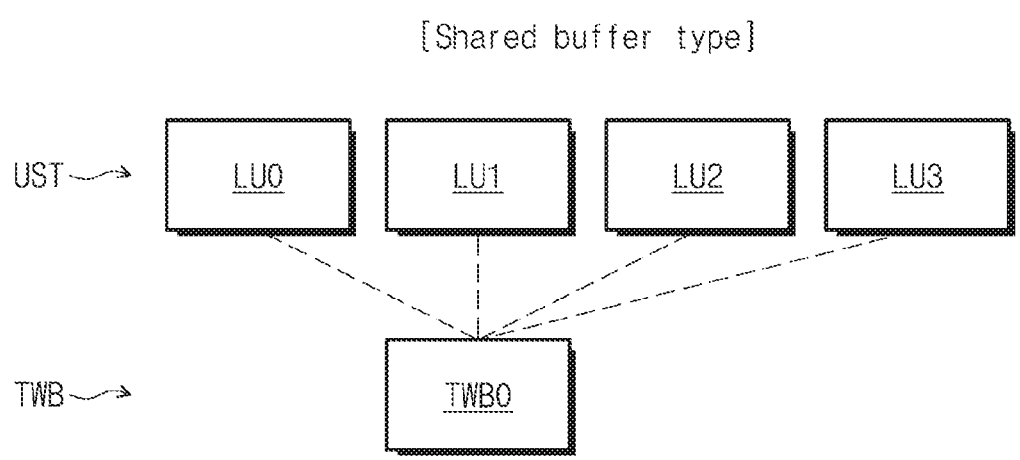

FIGS. 3A and 3B are diagrams for describing a turbo write buffer of FIG. 2. Referring to FIGS. 1, 2, 3A, and 3B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the non-volatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 3A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 3B, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 4A:
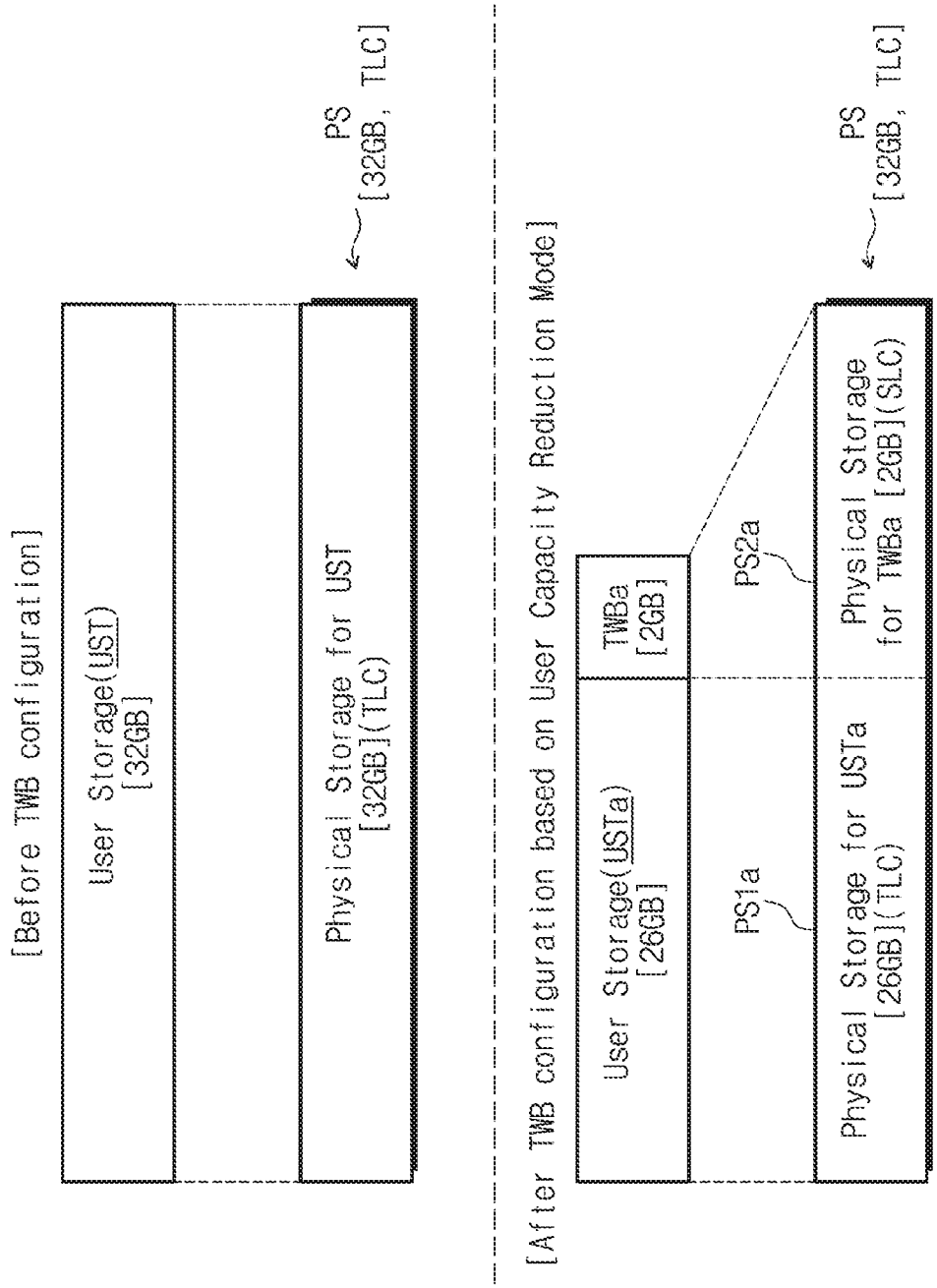
FIGS. 4A and 4B are diagrams for describing modes to configure a turbo write buffer of the storage device of FIG. 1 according to exemplary embodiments of the inventive concept.
Figure 4B:
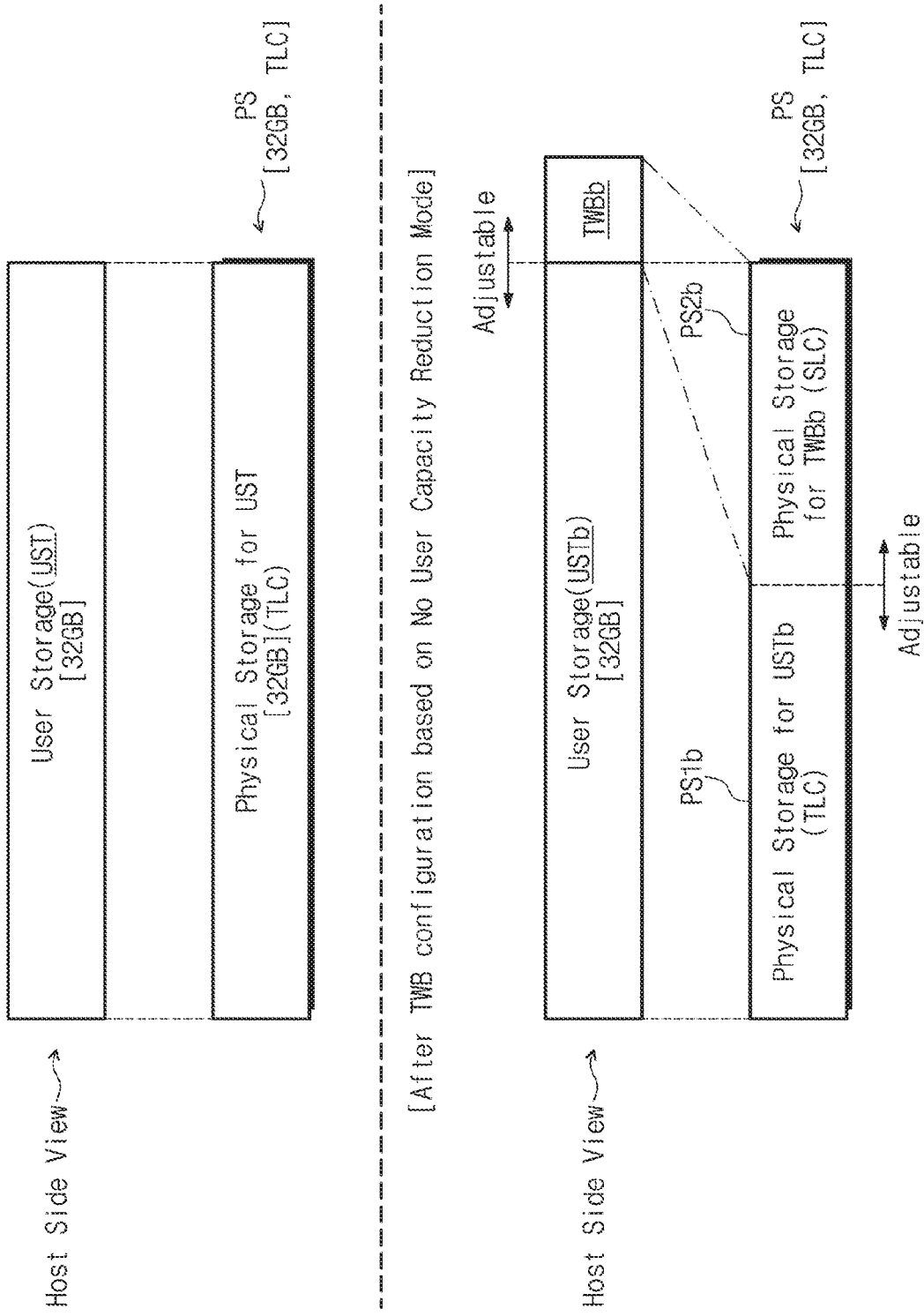

FIGS. 4A and 4B are diagrams for describing modes to configure a turbo write buffer of a storage device of FIG. 1. Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 4A, and 4B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 4A, the physical storage space PS of the storage device 1200 may be 32 GB on the basis of the TLC.

Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa or may be used for the turbo write buffer TWBa.

In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease (e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1".

In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PSIa corresponding to the user storage USTa and the second physical storage space PS2a corresponding to the turbo write buffer TWBa may be physically adjacent to each other or may be physically spaced from each other.

The no user capacity reduction mode may be a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the no user capacity reduction mode, the turbo write buffer TWBb having a particular capacity (e.g., 2 GB) may be configured. A second physical storage space PS2*b*, which is a portion of the physical storage space PS, may be assigned to the turbo write buffer TWBb or may be used for the turbo write buffer TWBb.

Unlike the user capacity reduction mode, the user storage USTb in the no user capacity reduction mode may maintain the capacity of 32 GB. In other words, in the no user capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the no user capacity reduction mode, a size or configuration of the turbo write buffer TWBb may be varied by an internal policy of the storage device 1200 or an explicit request from the host 1100. For example, because the second physical storage space PS2*b*, which is a portion of the physical storage space PS, is used to configure the turbo write buffer TWBb, the first physical storage space PS1*b* to be used for the user storage USTb may be smaller than a capacity of the user storage USTb.

In other words, in the case where the entire first physical storage space PS1*b* is used to store user data or an available free capacity of the first physical storage space PS1*b* is equal to or smaller than a reference value, all or a portion of the second physical storage space PS2*b* used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2*b* assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSize") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the no user capacity reduction mode, because the user storage UST and the turbo write buffer TWB share the physical storage space PS, in the case where a write operation is performed on the user storage UST, the lifetime of the turbo write buffer TWB may decrease.

Figure 5:
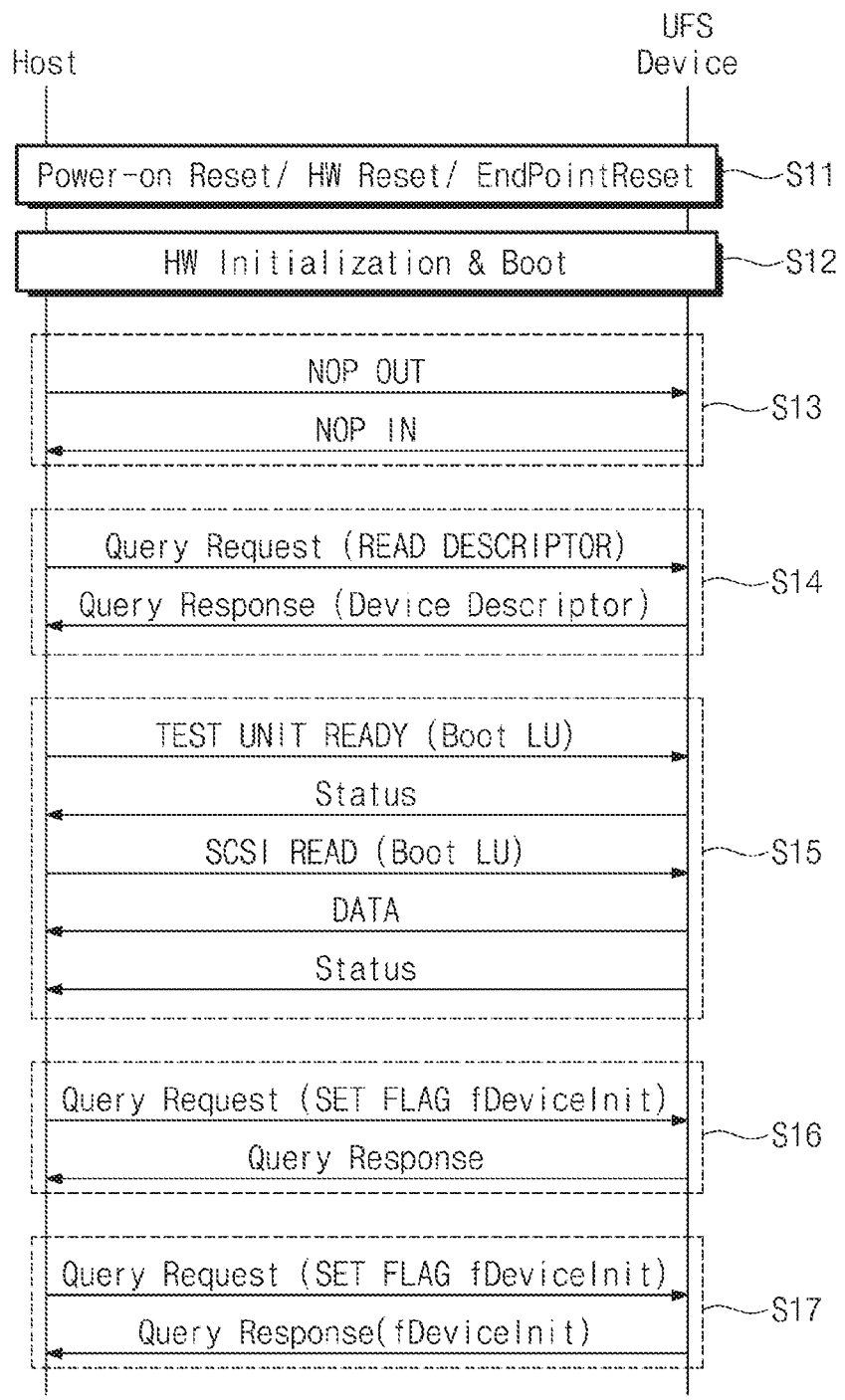
FIG. 5 is a flowchart illustrating an operation of the storage system of FIG. 1 according to an exemplary embodiment of the inventive concept.

FIG. 5 is a flowchart illustrating an operation of a storage system of FIG. 1. An initialization operation of the storage system 1000 is described with reference to FIG. 5.

Referring to FIGS. 1, 2, and 5, in operation S11, the host 1100 and the storage device 1200 may perform an operation such as a power-on reset operation, a hardware reset operation, or an endpoint reset operation.

In operation S12, the host 1100 and the storage device 1200 may perform hardware reset and booting. For example, hardware layers of each of the host 1100 and the storage device 1200 may be initialized and booted.

In operation S13, the host 1100 and the storage device 1200 may perform initialization on a particular layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeaturesSupport") including information about whether to support the turbo write function. In an exemplary embodiment of the inventive concept, the information about whether to support the turbo write function may be set to a particular bit (e.g., bit[8]) of the extended UFS function support field.

The device descriptor may further include a turbo write buffer no user space reduction enable field (e.g., "bTurboWriteBufferNoUserSpaceReductionEn") including information about a turbo write buffer mode. In the case where a value of the turbo write buffer no user space reduction enable field is "00h", the turbo write buffer TWB may be configured depending on the user capacity reduction mode described with reference to FIG. 4A. In the case where a value of the turbo write buffer no user space reduction enable field is "01h", the turbo write buffer TWB may be configured depending on the no user capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 3A. In the case where a value of the turbo write buffer type field is "01h", the turbo write buffer TWB may be configured depending on the shared buffer type described with reference to FIG. 3B.

The device descriptor may further include a shared turbo write buffer allocation number field (e.g., "dNumSharedTurboWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer no user space reduction enable, and the number of units assigned to a turbo write buffer, by writing values of various fields of the configuration descriptor. In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no user capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "fDeviceInit") of the flag of the storage device 1200. For example, the host 1100 may transfer a query request for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 6:
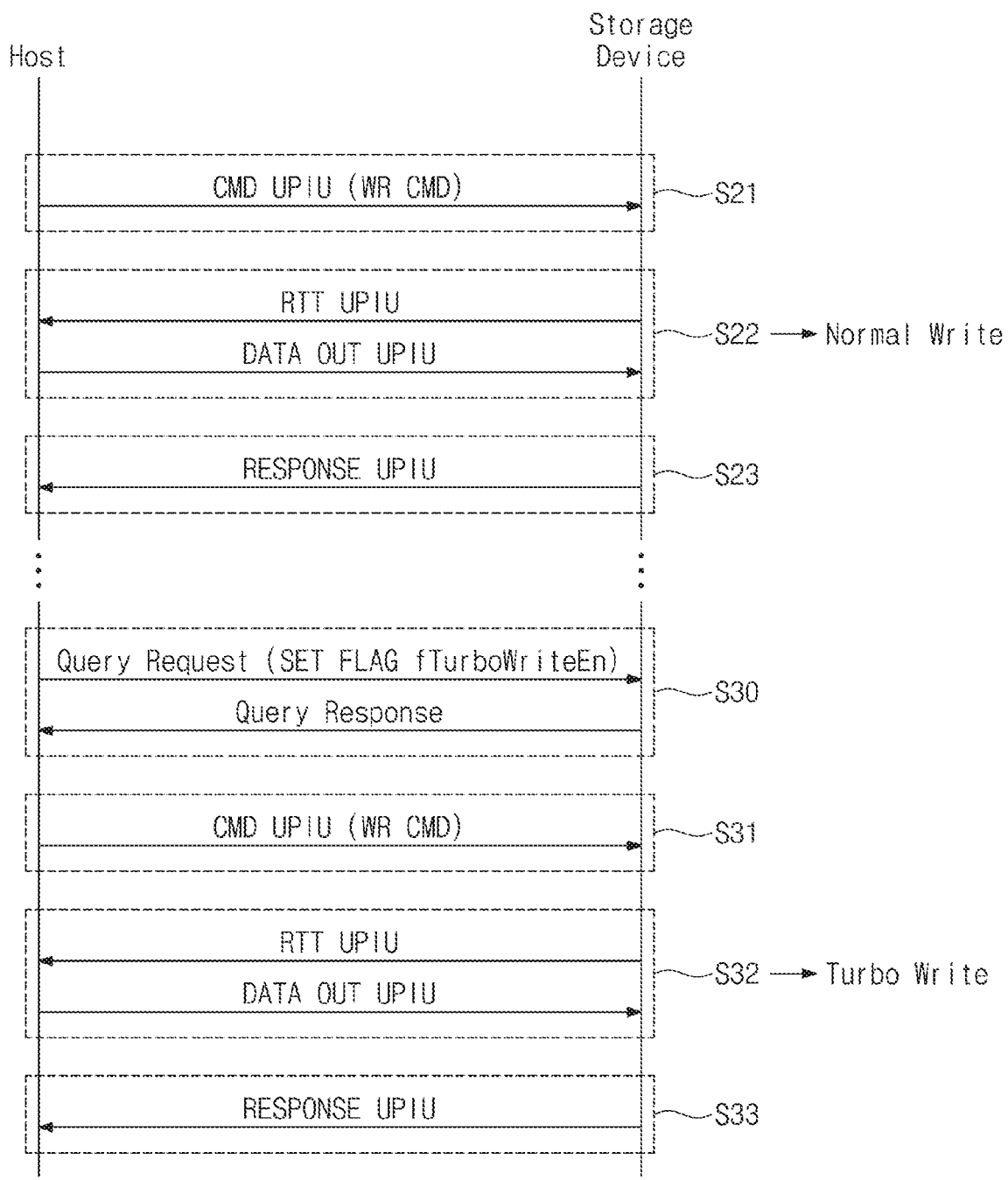
FIG. 6 is a flowchart illustrating an operation of the storage system of FIG. 1 according to an exemplary embodiment of the inventive concept.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation S30, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 8.

In an exemplary embodiment of the inventive concept, even though the turbo write function is enabled, in the case where a space of the turbo write buffer TWB is insufficient, the storage device 1200 may write the received write data in the user storage UST.

Figure 7:
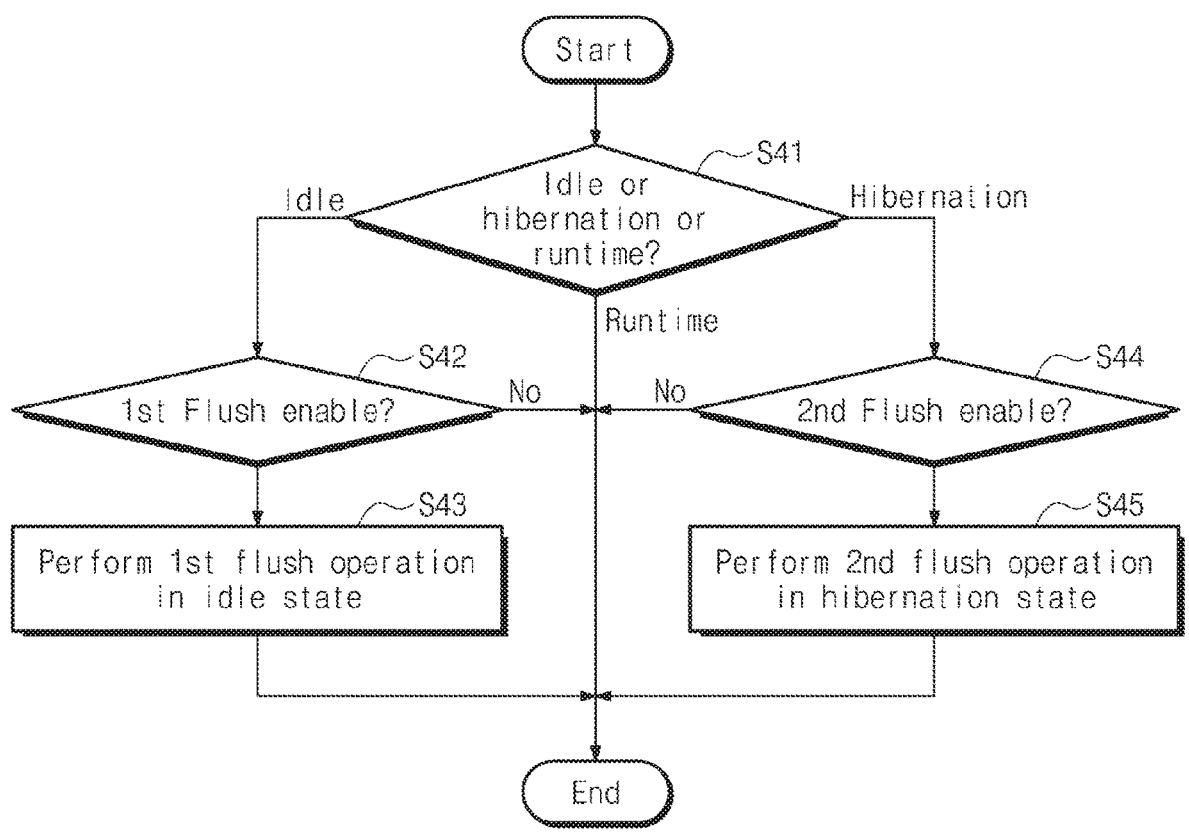
FIG. 7 is a flowchart illustrating an operation of the storage device of FIG. 1 according to an exemplary embodiment of the inventive concept.

FIG. 7 is a flowchart illustrating an operation of a storage device of FIG. 1. A flush operation of the storage device 1200 will be described with reference to FIG. 7. Referring to FIGS. 1, 2, and 7, in operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0b", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 7 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 8:
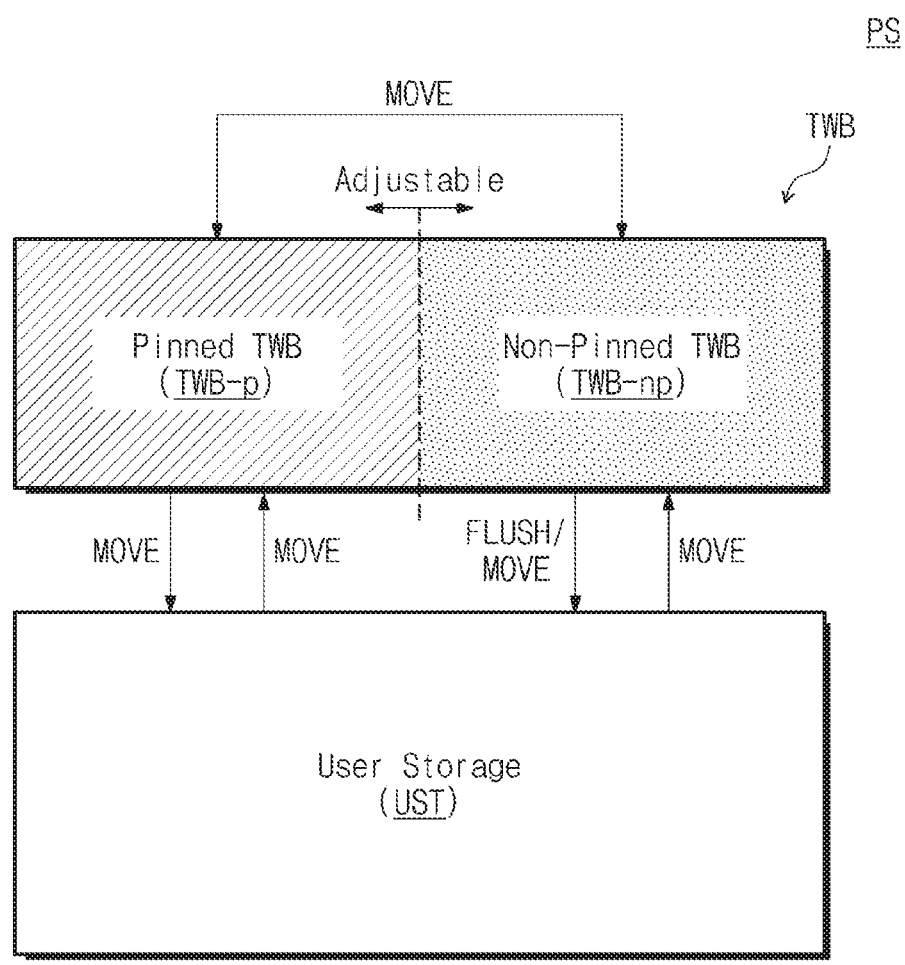
FIG. 8 is a block diagram illustrating a physical storage space of the storage device of FIG. 1 according to an exemplary embodiment of the inventive concept.

FIG. 8 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB-np.

In an embodiment, data stored in the pinned turbo write buffer TWB-p is not targeted for a move (e.g., a migrate or a flush) to the user storage UST, and data stored in the non-pinned turbo write buffer TWB-np may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 9:
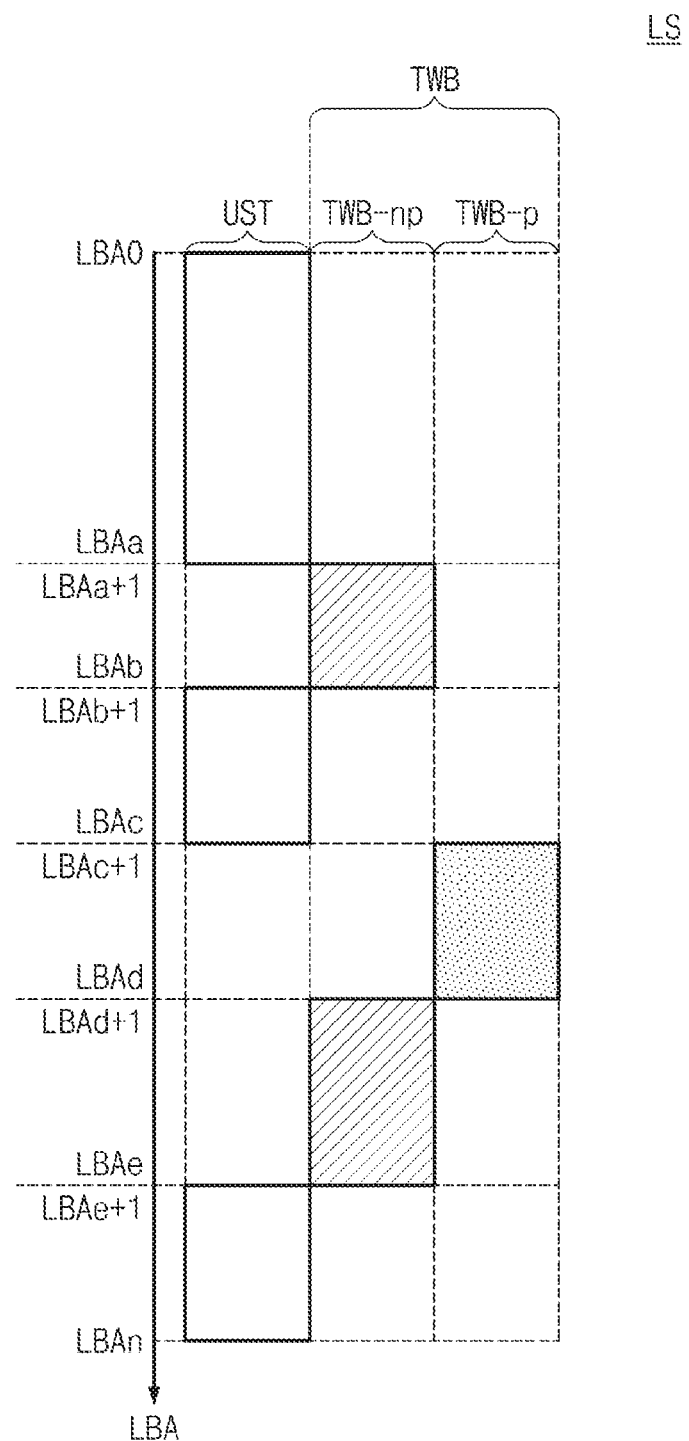
FIG. 9 is a diagram illustrating a logical storage space for the physical storage space of the storage device described with reference to FIG. 8 according to an exemplary embodiment of the inventive concept.

FIG. 9 is a diagram illustrating a logical storage space for the physical storage space PS of the storage device 1200 described with reference to FIG. 8. For convenience of description, the embodiment of FIG. 9 will be described with reference to one logical unit. However, the inventive concept may be identically applied to two or more logical units to which the turbo write buffers TWB correspond, or a relationship between logical units and a shared turbo write buffer (e.g., TWB0).

Referring to FIGS. 1 and 9, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np. In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p. In this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UPIU) information of the pinned turbo write buffer TWB-p and the non-pinned turbo write buffer TWB-np from the storage device 1200 periodically or if necessary.

Figure 10A:
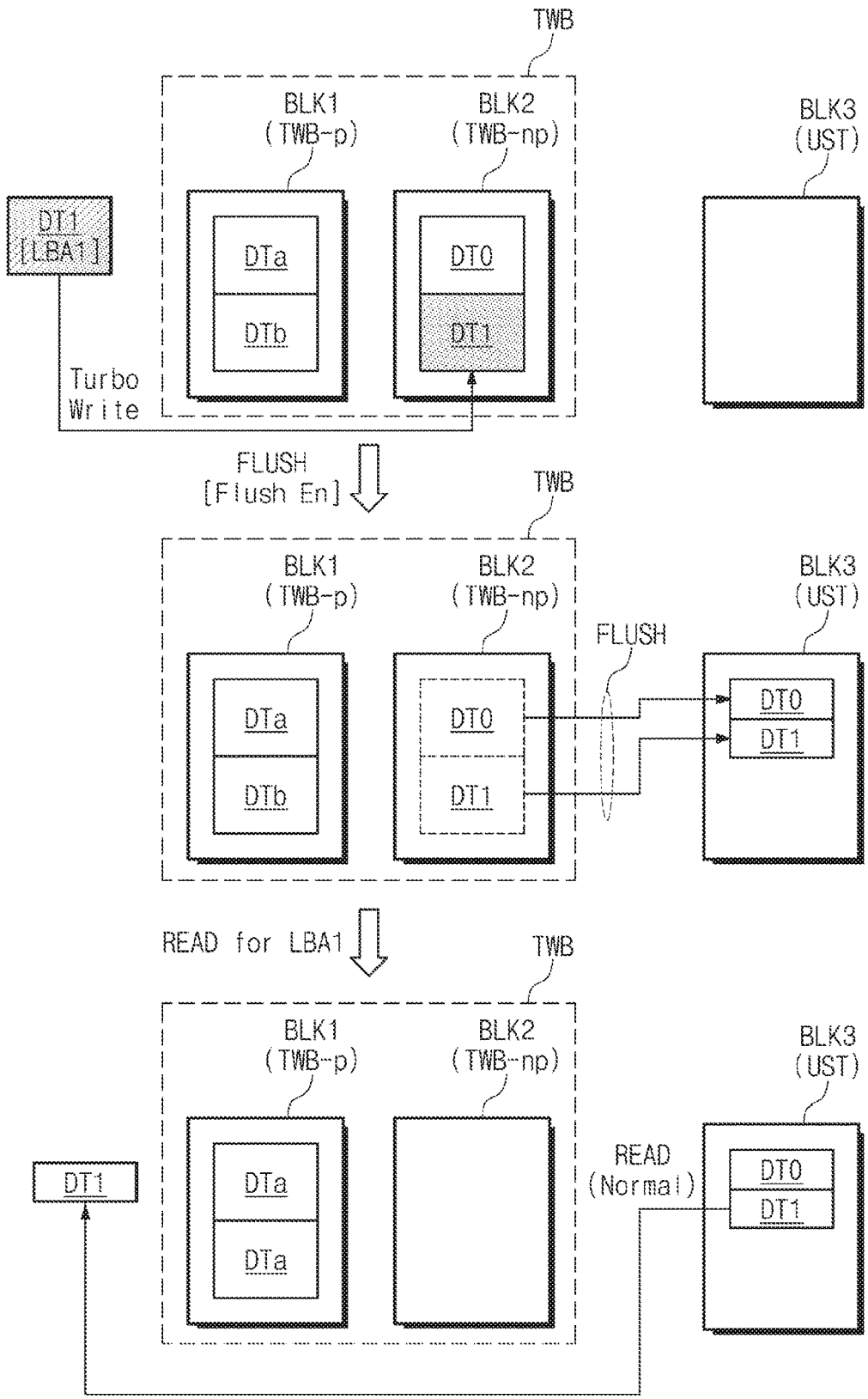
FIGS. 10A and 10B are diagrams illustrating an operation in the physical storage space of the storage device described with reference to FIG. 8 according to exemplary embodiments of the inventive concept.
Figure 10B:
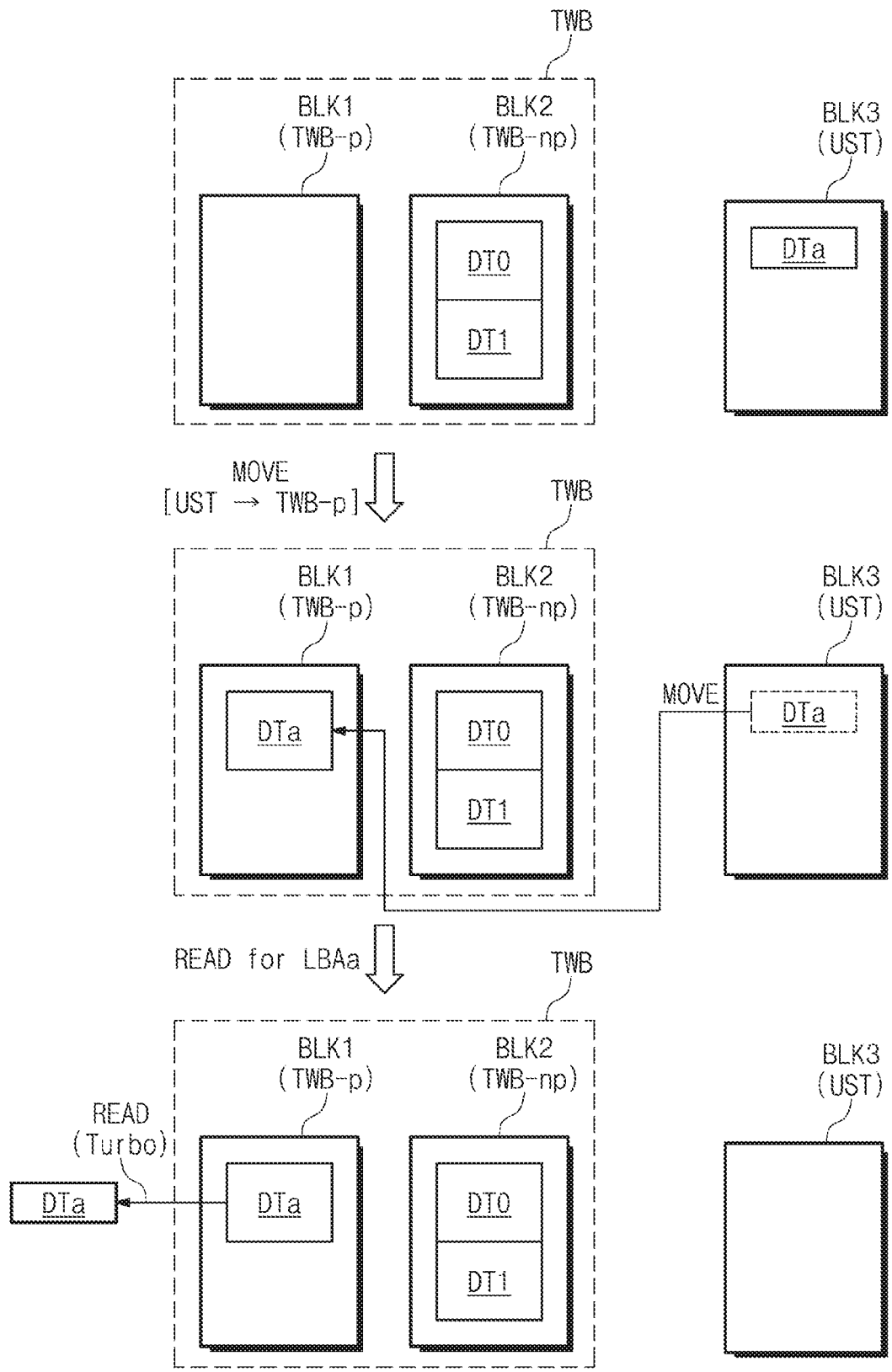

FIGS. 10A and 10B are diagrams illustrating an operation in a physical storage space of a storage device described with reference to FIG. 8. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Referring to FIGS. 1, 8, and 10A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np).

In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 10A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the user data DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 8, and 10B, the 0-th and first data DT0 and DT1 may be stored in the second memory block BLK2 of the non-pinned turbo write buffer TWB-np, and the a-th data DTa may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer TWB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

Figure 11:
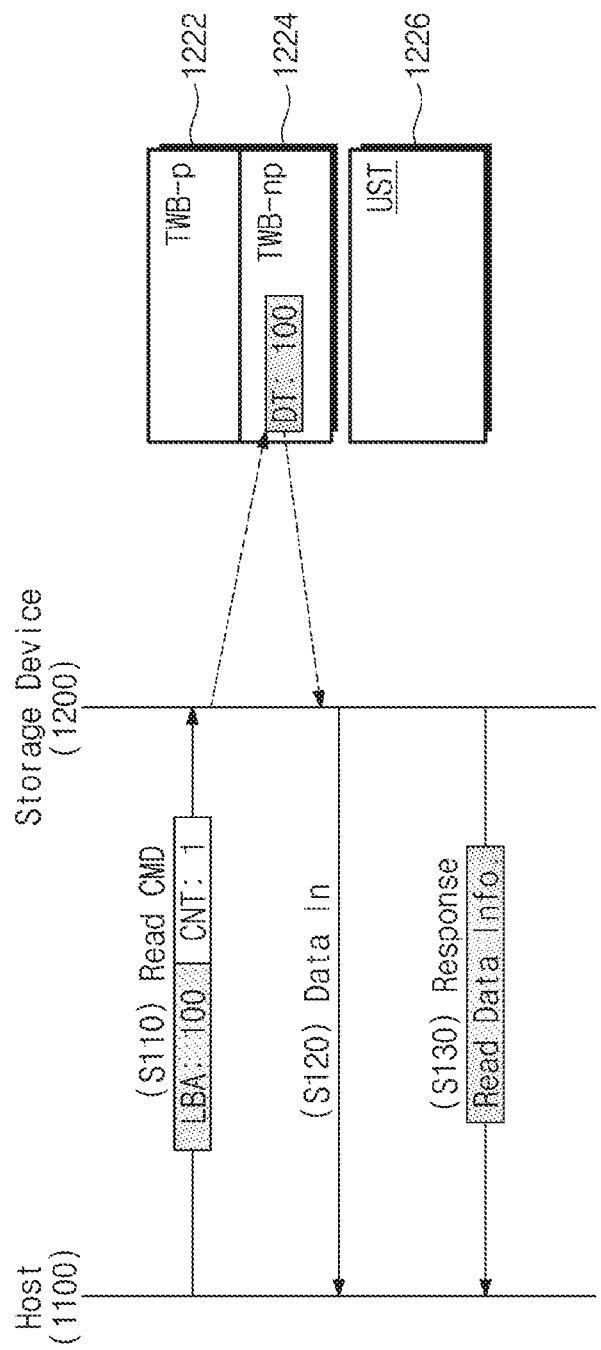
FIG. 11 is a diagram illustrating an operation method of a storage system according to an exemplary embodiment of the inventive concept.

FIG. 11 is a diagram illustrating an operation method of a storage system according to an exemplary embodiment of the inventive concept. A read operation of the storage system 1000 will be described with reference to FIGS. 1 and 11. The storage device 1200 may include a pinned turbo write buffer (TWB-p) 1222, a non-pinned turbo write buffer (TWB-np) 1224, and a user storage (UST) 1226. As discussed above, the pinned turbo write buffer (TWB-p) 1222 may be an area in which stored data are prohibited from moving to the user storage (UST) 1226. The non-pinned turbo write buffer (TWB-np) 1224 may be an area in which stored data are allowed to move to the user storage (UST) 1226.

In operation S110, the host 1100 may transfer the command UPIU including the read command to the storage device 1200. The host 1100 provides a read address, which is an address of data to be read, in the read command. In this case, the provided read address includes a logical block address LBA and a count CNT. Here, the logical block address LBA may correspond to a start address of the read data, and the count CNT indicates an address range. For example, the host 1100 may provide a logical block address LBA of "100" and the count CNT of "1" as the read address.

The storage device 1200 receives the read command, e.g., a read request, from the host 1100. In response to the read command, the storage device 1200 reads data DT of "100" stored in the logical block address LBA of "100". For example, the data DT of "100" may be data stored in a non-pinned turbo write buffer (TWB-np) 1224 of the turbo write buffer TWB. The storage device 1200 reads the data DT of "100" stored in the non-pinned turbo write buffer (TWB-np) 1224. According to exemplary embodiments of the inventive concept, the storage device 1200 may read the data DT from at least one of the pinned turbo write buffer (TWB-p) 1222, the non-pinned turbo write buffer (TWB-np) 1224, and the user storage (UST) 1226. Different scenarios will be discussed in detail below, e.g., in FIGS. 17-21.

In operation S120, the storage device 1200 transfers the data DT of "100" stored in the non-pinned turbo write buffer (TWB-np) 1224 to the host 1100. For example, the storage device 1200 may transfer a DATA IN UPIU packet (a data transfer packet) including the read data DT of "100" to the host 1100. A plurality of DATA IN UPIU packets may be transferred to transfer all the requested read data to the host 1100.

In operation S130, the storage device 1200 may transfer a response, providing notification that the read data DT of "100" are completely transferred, to the host 1100. In the UFS interface, the storage device 1200 may transfer a response UPIU for the purpose of transferring the response to the host 1100. In particular, read data information including attributes of the read data DT may be included in the response UPIU according to an exemplary embodiment of the inventive concept. The read data information may include information about a location (location information) of the storage device 1200, at which the read data DT of "100" are stored, and hit/miss information (feedback information). In the illustrated example, the read data information may further include information indicating that the read data DT of "100" are read from the non-pinned turbo write buffer (TWB-np) 1224. Additionally, the read data information may further include information corresponding to a hit indicating that the read data DT of "100" are present in the turbo write buffer TWB. In other scenarios, the hit/miss information may include move information (e.g., described with reference to FIGS. 20 and 24) of the read data DT in the storage device 1200 or partial hit information (e.g., described with reference to FIG. 21) indicating a partial hit where the read data DT are present in the turbo write buffer TWB and the user storage (UST) 1226.

Figure 12:
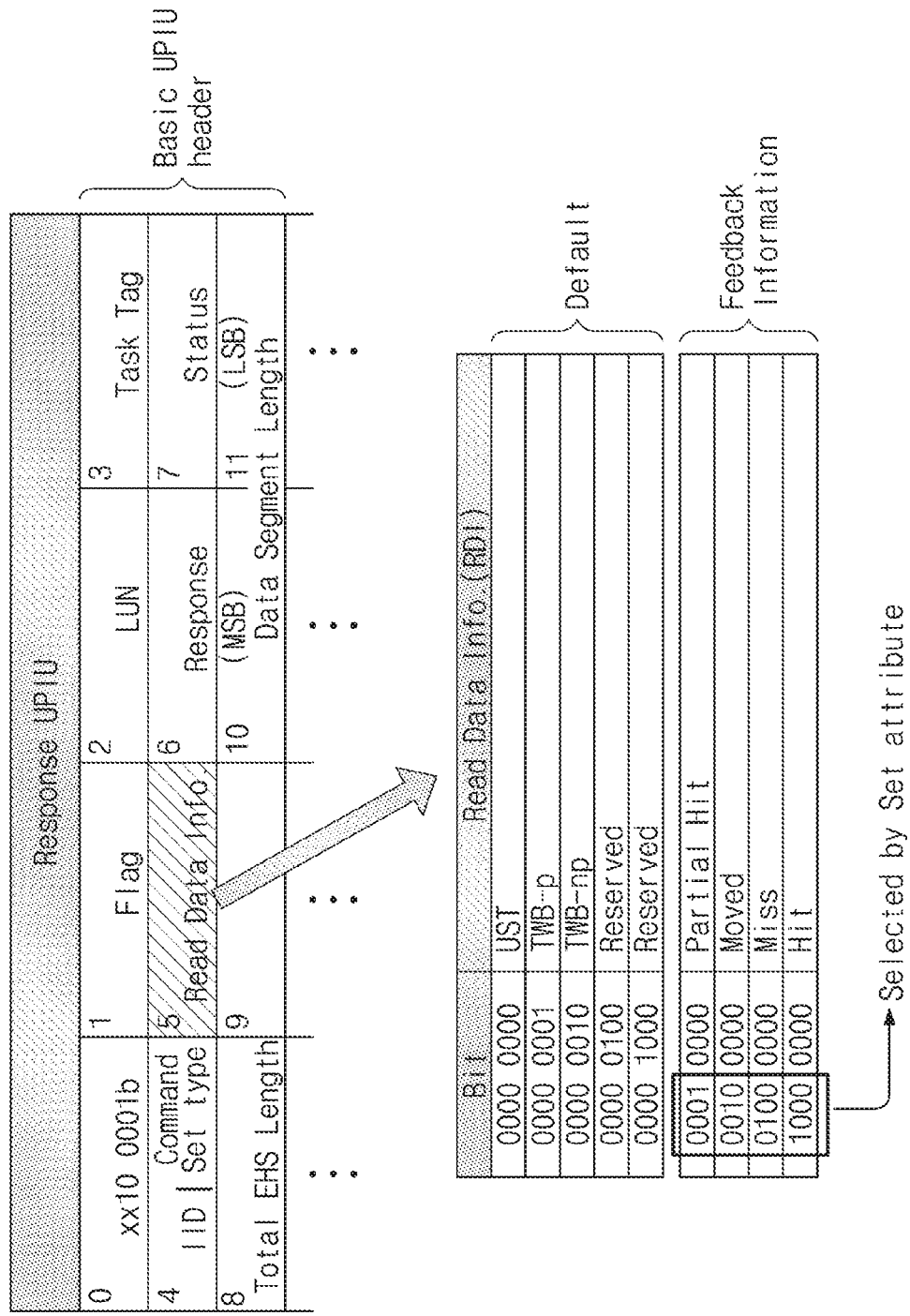
FIG. 12 is a table illustrating read data information according to an exemplary embodiment of the inventive concept.

FIG. 12 is a table illustrating read data information according to an exemplary embodiment of the inventive concept. Referring to FIG. 12, read data information RDI may be implemented with a read data information (RDI) field included in the response UPIU.

In the case where the storage device 1200 transfers a response to the host 1100 by using the UFS interface, the response UPIU illustrated in the table may be defined. The response UPIU according to an exemplary embodiment of the inventive concept may include information indicating a completion of the task requested by the host 1100 and a status of the task that the storage device 1200 intends to provide to the host 1100. The response UPIU includes a basic UPIU header and additional information. The 12-byte basic UPIU header is defined in the UFS interface.

The read data information RDI according to an exemplary embodiment of the inventive concept may be allocated to the sixth byte 5 of the basic UPIU header. The read data information RDI may have an 8-bit length. For example, the lower four bits of the read data information RDI may indicate location information of an area from which read data are read. The upper four bits of the read data information RDI may be configured to indicate feedback information, e.g., a hit/miss or a move.

It is assumed that the 8-bit read data information RDI included in the response UPIU is "0000 0000". Information is not included in the upper four bits, and the lower four bits indicate that read data are read from a user storage (UST) area. The case where the upper four bits are "0000" means that information is not included. The case where the lower four bits of the read data information RDI are "0001" means that read data are read from a pinned turbo write buffer (TWB-p) area. The case where the lower four bits of the read data information RDI are "0010" means that read data are read from a non-pinned turbo write buffer (TWB-np) area. Fields in which the lower four bits of the read data information RDI are "0100" and "1000" may be reserved fields.

The upper four bits of the 8-bit read data information RDI included in the response UPIU may be configured to indicate a hit/miss or a move. The case where the fourth bit or the least significant bit of the upper four bits of the read data information RDI is "1" (e.g., the case where the upper four bits are "0001") indicates a partial hit meaning that a portion of the read-requested data is present in the turbo write buffer TWB. The case where the third bit of the upper four bits of the read data information RDI is "1" (e.g., the case where the upper four bits are "0010") indicates that the read-requested data are moved between areas of the storage device 1200. The case where the second bit of the upper four bits of the read data information RDI is "1" (e.g., the case where the upper four bits are "0100") indicates a miss state meaning that the read-requested data are absent from the turbo write buffer TWB. The case where the first bit or the most significant bit of the upper four bits of the read data information RDI is "1" (e.g., the case where the upper four bits are "1000") indicates a hit meaning that the read-requested data is present in the turbo write buffer TWB.

Here, bit values of the upper four bits may be combined and used. For example, the case where the upper four bits are "0110" means both a "miss" state and a "moved" state. Additionally, the lower four bits may be the read data information RDI that is provided by default when the storage device 1200 transfers the response UPIU after the read data are transferred. In contrast, the upper four bits of the read data information RDI may be transferred only through a query request of the host 1100. In other words, in the case where the host 1100 intends to monitor a data move or a hit/miss in the storage device 1200, the host 1100 may request feedback information through the query request before transferring the read command. This procedure will be described in detail with reference to FIG. 13.

Figure 13:
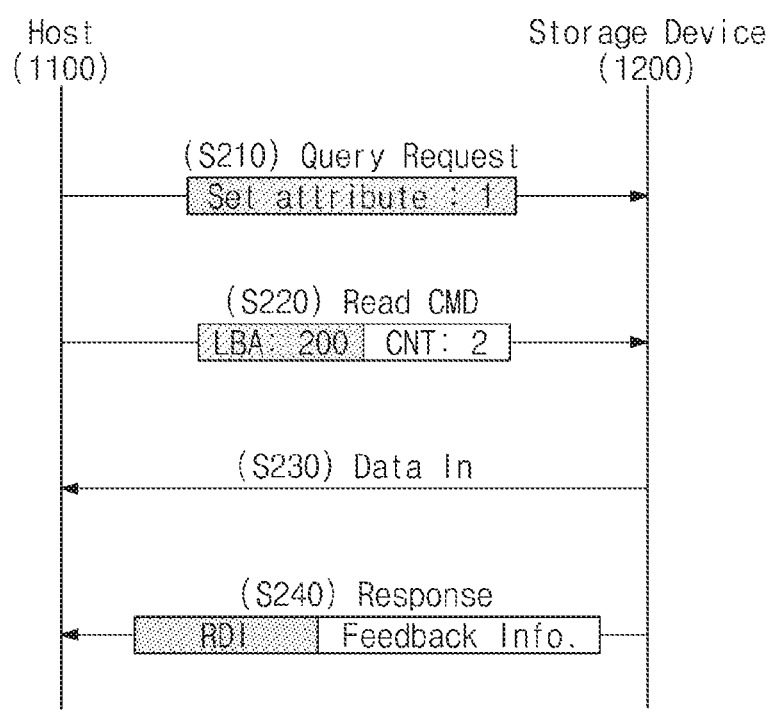
FIG. 13 is a diagram illustrating a query request process of a host for requesting upper four bits of read data information according to an exemplary embodiment of the inventive concept.

FIG. 13 is a diagram illustrating a query request process of a host for requesting upper four bits of read data information according to an exemplary embodiment of the inventive concept. Referring to FIG. 13, the host 1100 may configure the storage device 1200 to include a value indicating a hit/miss of the read data in the read data information RDI through the query request for a set attribute by the host 1100.

In operation S210, the host 1100 performs the set attribute such that feedback information indicating a hit/miss of the read data is included in the read data information RDI, before transferring the read command. For example, the host 1100 may transfer the query request to the storage device 1200 to set an attribute. After the set attribute is set to "1", the feedback information indicating a hit/miss of the read data may be included in the response UPIU whenever the read command is transferred.

In operation S220, the host 1100 may transfer the command UPIU including the read command to the storage device 1200. The host 1100 may provide the logical block address LBA of "200" and the count CNT of "2" as the read address.

In operation S230, the storage device 1200 may read data of a memory area corresponding to the read address, may generate the DATA IN UPIU packet, and may transfer the DATA IN UPIU packet to the host 1100.

In operation S240, the storage device 1200 transfers, to the host 1100, the response UPIU including the read data information RDI in which the feedback information indicating a hit/miss of the read data is included. Until an additional query request for changing the set attribute is received, the storage device 1200 may transfer the read data information RDI including the feedback information to the host 1100 whenever the read command is received.

FIG. 14 illustrates a method for transferring additional information through a response, according to an exemplary embodiment of the inventive concept. Referring to FIG. 14, in the case where the read data correspond to a partial hit, the storage device 1200 may transfer address information to the host 1100 by using a particular field of the response UPIU.

In the case where the read data requested by the host 1100 correspond to a partial hit, the storage device 1200 may notify the host 1100 of the partial hit by using the feedback information of the read data information RDI. For example, the case where a logical value of the feedback information (e.g., the upper four bits of the read data information RDI) is "0001" indicates that the read data corresponds to a partial hit. The storage device 1200 may additionally write LBA length information about the partial hit in a sense data field of the response UPIU.

For example, in the case where the read-requested data belong to a logical block address range from LBA100 to LBA150, data from LBA100 to LBA120 may correspond to a hit, and data from LBA121 to LBA150 may correspond to a miss. In this case, the storage device 1200 may write LBA length information corresponding to a hit or a miss in the sense data field from a (k+2)-th byte to a (k+17)-th byte and may transmit the response UPIU including the LBA length information to the host 1100. Here, a description is given where the LBA length information is written in the sense data field, but the inventive concept is not limited thereto. In the case of the partial hit, it may be well understood that reserved fields of the response UPIU may be used to load the LBA length information.

Figure 15:
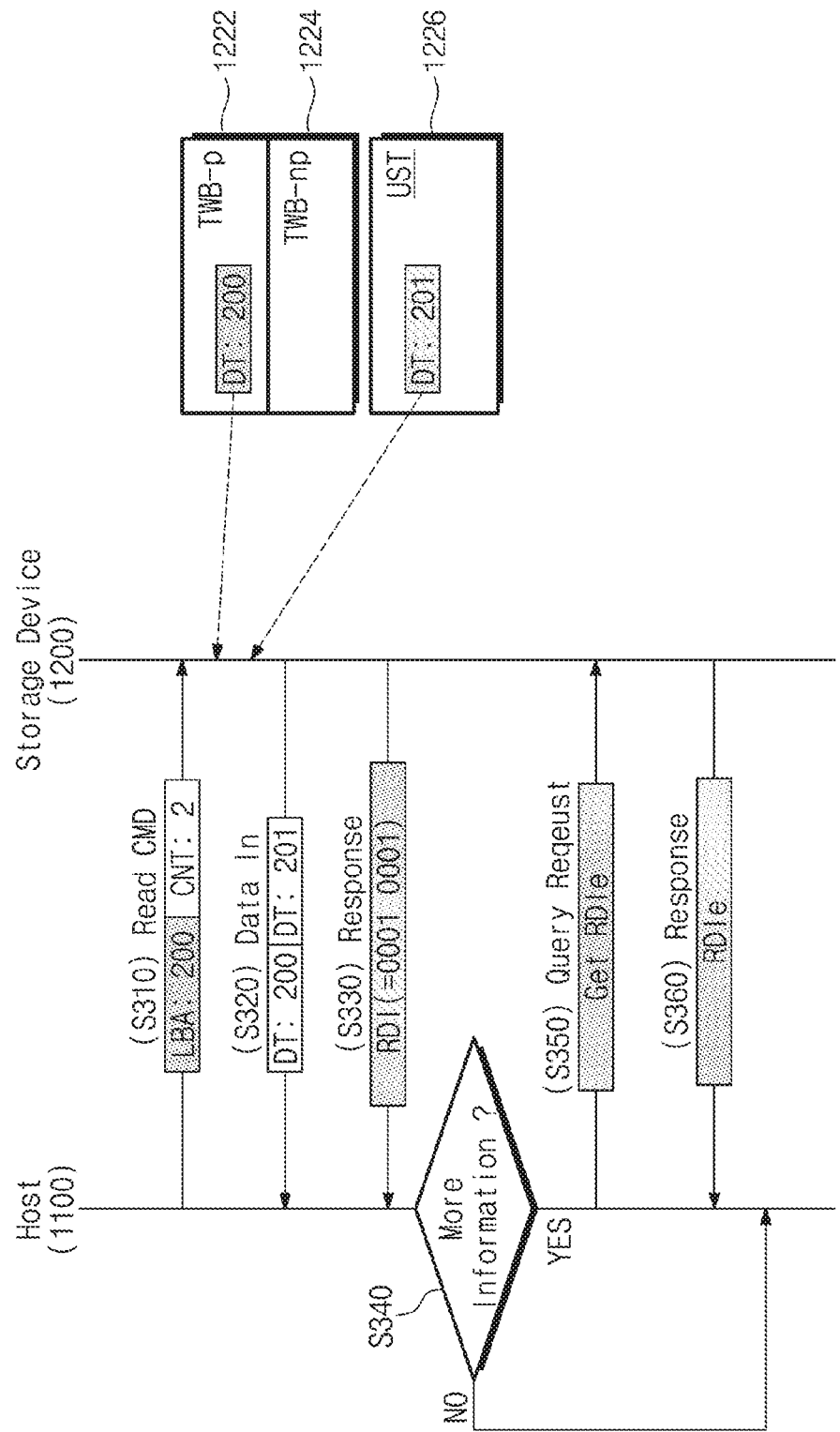
FIG. 15 is a diagram illustrating a method for obtaining detailed information when a partial hit occurs in a storage system according to an exemplary embodiment of the inventive concept.

FIG. 15 is a diagram illustrating a method for obtaining detailed information when a partial hit occurs in a storage system according to an exemplary embodiment of the inventive concept. Below, the read operation of the storage system 1000 of the inventive concept will be described with reference to FIGS. 1 and 15. Here, it is assumed that the set attribute (=1) of the storage device 1200 is already completed through the query request.

In operation S310, the host 1100 may transfer the command UPIU including the read command to the storage device 1200. The host 1100 includes information (LBA: 200, CNT: 2) of data to be read in the read command. In response to the read command, the storage device 1200 reads data DT of "200" and "201" stored at the logical block address LBA of "200". The storage device 1200 may read the data DT of "200" stored in the pinned turbo write buffer (TWB-p) 1222 of the turbo write buffer TWB in response to the read command. The storage device 1200 reads the data DT of "201" stored in the user storage (UST) area 1226 in response to the read command.

In operation S320, the storage device 1200 transfers the read data DT of "200" and "201" to the host 1100. For example, the storage device 1200 may transfer at least one DATA IN UPIU packet including the read data DT of "200" and "201" to the host 1100.

In operation S330, the storage device 1200 may transfer a response to the host 1100. The storage device 1200 may transfer the response UPIU including the read data information RDI. Depending on the set attribute, information about locations of the storage device 1200, at which the read data DT of "200" and "201" are stored, and hit/miss information may be included in the read data information RDI. In the illustrated example, it is assumed that the read data information RDI has a logical value of "0001 0001". According to the definition of FIG. 12, the lower four bits of the read data information RDI, that is, "0001", indicates the pinned turbo write buffer (TWB-p) 1222, and the upper four bits of the read data information RDI, that is, "0001", indicates a partial hit.

In operation S340, the host 1100 may check a partial hit state of the read data information RDI and may determine whether additional information is required. When it is determined that the additional information is required (Yes), the procedure proceeds to operation S350. When it is determined that the additional information is not required (No), the procedure is terminated.

In operation S350, the host 1100 transfers the query request for requesting the additional information of the read data corresponding to the partial hit to the storage device 1200. For example, the host 1100 may transfer the query request for requesting extended read data information RDIe about the read data corresponding to the partial hit.

In operation S360, the storage device 1200 may prepare the extended read data information RDIe for the read operation (performed from operation S310 to operation S330) and may return the extended read data information RDIe to the host 1100. For example, the storage device 1200 may provide the response UPIU including the extended read data information RDIe to the host 1100. The extended read data information RDIe may be, for example, read data attribute information about the read data DT of "200" and "201" that the host 1100 receives in operation S320 in response to the query request, separately from the read data information RDI.

FIG. 16 is a table illustrating extended read data information described with reference to FIG. 15 according to an exemplary embodiment of the inventive concept. Referring to FIGS. 15 and 16, the host 1100 that checks a partial hit state of the read data may request the extended read data information RDIe through the query request. In this case, the storage device 1200 may load the extended read data information RDIe that is the read data attribute information on the response UPIU, and may transfer the response UPIU to the host 1100.

The extended read data information RDIe may include an address (LBA and Count) at which read data are read, a hit rate, etc. For example, an LBA value of a memory where the read data are read may be allocated to four bytes Byte 0 to Byte 3 of the extended read data information RDIe. An LBA count of the read data may be allocated to one byte (e.g., Byte 4). In particular, a hit rate of the pinned turbo write buffer (TWB-p) 1222 may be allocated to Byte 5, and a hit rate of the non-pinned turbo write buffer (TWB-np) 1224 may be allocated to Byte 6. In other words, Byte 5 of the two bytes for the hit rate may be used to allocate the hit rate of the pinned turbo write buffer (TWB-p) 1222. Byte 6 of the two bytes for the hit rate may be used to allocate the hit rate of the non-pinned turbo write buffer (TWB-np) 1224. The remaining byte Byte 7 may be used as a reserved field, and additional read data attribute information may be written in the reserved field if necessary.

An example of the extended read data information RDIe about the read data previously transferred by the query request of the host 1100 is described above. It may be well understood that a kind or a size of each of pieces of information to be included in the extended read data information RDIe may be variously added or modified.

FIGS. 17 to 21 are diagrams illustrating a method for receiving read data information for each scenario, according to exemplary embodiments of the inventive concept. Examples in which the storage device 1200 includes the read data information RDI having various attributes in the response UPIU and then transfers the response UPIU will be described with reference to FIGS. 17 to 21. In other words, FIGS. 17 and 21 will be described under the assumption that the host 1100 already completes the set attribute (=1) of the storage device 1200 through the query request.

Figure 17:
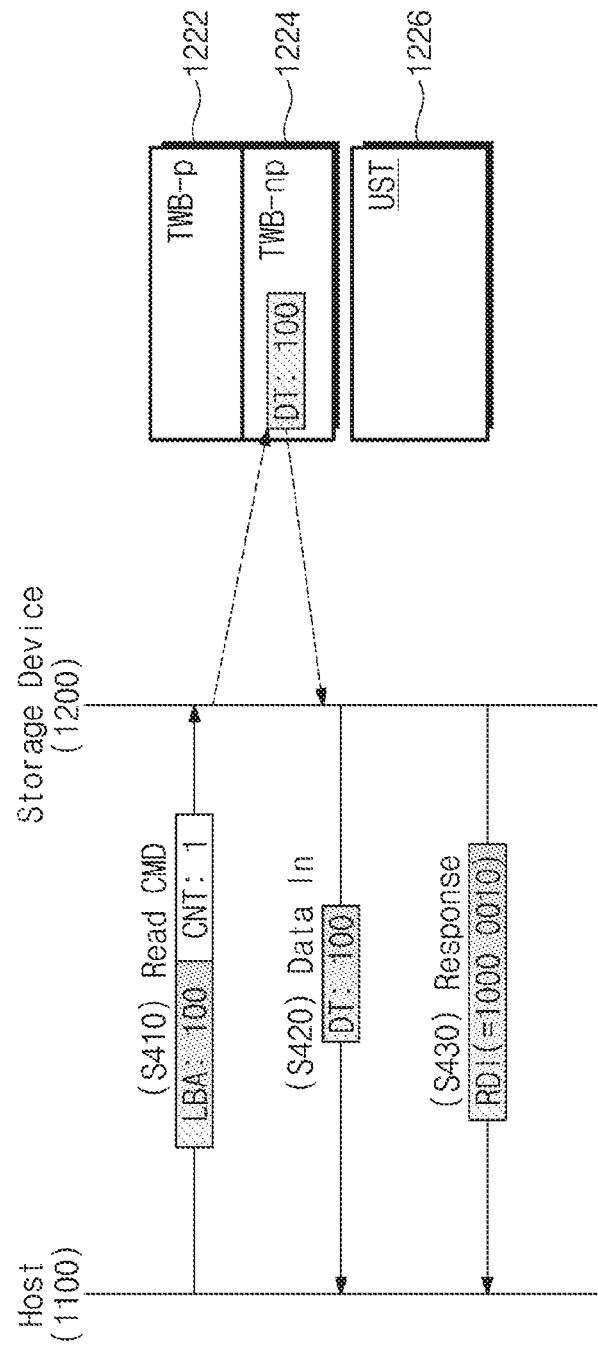
FIG. 17 illustrates an example of a hit state of read-requested data according to an exemplary embodiment of the inventive concept.
Figure 18:
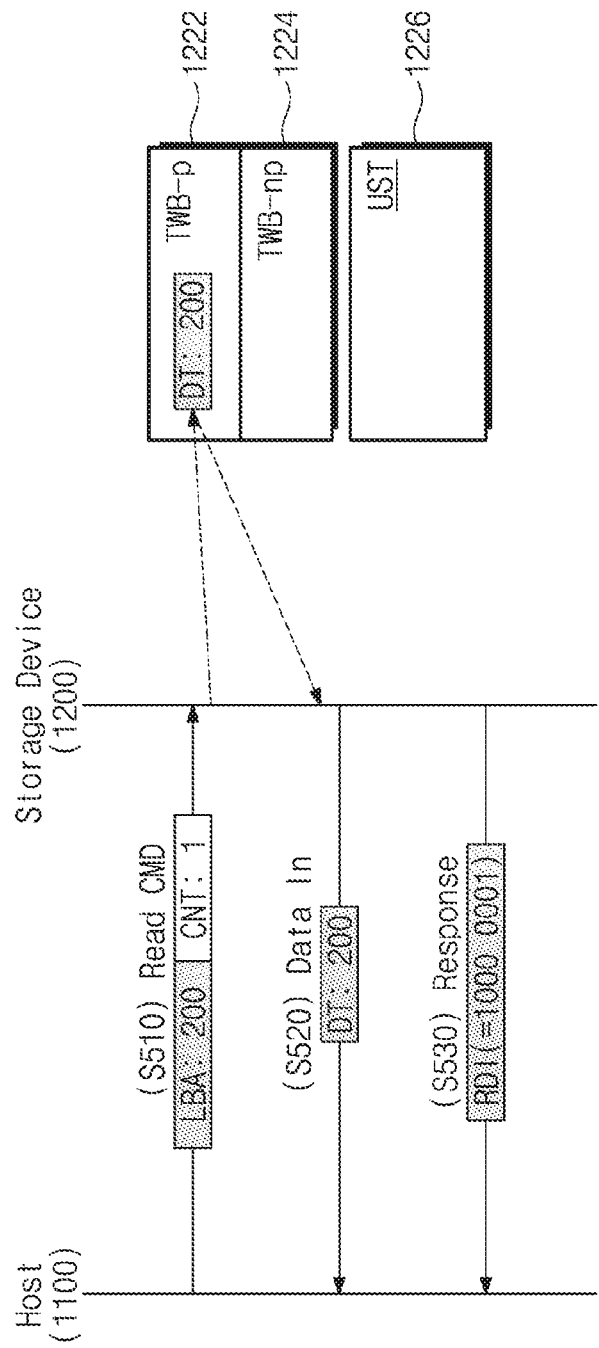
FIG. 18 illustrates an example of a hit state of read-requested data according to an exemplary embodiment of the inventive concept.

FIGS. 17 and 18 illustrate cases where read data (e.g., the data DT) is read from the non-pinned turbo write buffer (TWB-np) 1224 or the pinned turbo write buffer (TWB-p) 1222. The location information of the read data information RDI indicates the non-pinned turbo write buffer (TWB-np) 1224 or the pinned turbo write buffer (TWB-p) 1222 from which the read data is read. In other words, the lower four bits of the read data information RDI may be "0010" or "0001." The feedback information indicates that a hit occurs in the turbo write buffer TWB. In other words, the upper four bits of the read data information RDI may be "1000."

In exemplary embodiments of the inventive concept, the read data may be read from both the non-pinned turbo write buffer (TWB-np) 1224 and the pinned turbo write buffer (TWB-p) 1222, in which case the lower four bits of the read data information RDI may be "0011."

FIG. 17 illustrates an example of a hit state of read-requested data according to an exemplary embodiment of the inventive concept. Referring to FIG. 17, the read data information RDI, corresponding to the case where the read-requested data are read from the non-pinned turbo write buffer (TWB-np) 1224, is provided to the host 1100.

In operation S410, the host 1100 may transfer the command UPIU including the read command to the storage device 1200. It is assumed that a read address provided together with the read command includes the logical block address LBA of "100" and the count CNT of "1". The storage device 1200 may read data stored in the non-pinned turbo write buffer (TWB-np) 1224 in response to the read command.

In operation S420, the storage device 1200 transfers the data DT of "100" stored in the non-pinned turbo write buffer (TWB-np) 1224 to the host 1100. For example, the storage device 1200 may transfer the DATA IN UPIU packet including the read data DT of "100" to the host 1100.

In operation S430, the storage device 1200 may transfer a response to the host 1100. In this case, the storage device 1200 according to an exemplary embodiment of the inventive concept may transfer the response UPIU. In particular, the read data information RDI (="1000 0010") may be included in the response UPIU according to an exemplary embodiment of the inventive concept. According to the definition of FIG. 12, because the upper four bits of the read data information RDI are "1000", the read data information RDI indicates that a hit occurs in the turbo write buffer TWB. Because the lower four bits are "0010", the read data information RDI indicates that the read data DT of "100" are read from the non-pinned turbo write buffer (TWB-np) 1224.

The host 1100 may receive the read data information RDI (="1000 0010") and may perform various memory management operations on the turbo write buffer TWB or the user storage UST.

FIG. 18 illustrates an example of a hit state of read-requested data according to an exemplary embodiment of the inventive concept. FIG. 18 illustrates a case where read-requested data are read from the pinned turbo write buffer (TWB-p) 1222.

In operation S510, the host 1100 may transfer the command UPIU including the read command to the storage device 1200. It is assumed that a read address provided together with the read command includes the logical block address LBA of "200" and the count CNT of "1". The storage device 1200 may read the data DT of "200" stored in the pinned turbo write buffer (TWB-p) 1222 in response to the read command.

In operation S520, the storage device 1200 transfers the data DT of "200" stored in the pinned turbo write buffer (TWB-p) 1222 to the host 1100. For example, the storage device 1200 may transfer the DATA IN UPIU packet including the read data DT of "200" to the host 1100.

In operation S530, the storage device 1200 may transfer a response to the host 1100. In this case, the storage device 1200 of the inventive concept may transfer the response UPIU. In particular, the read data information RDI (="1000 0001") may be included in the response UPIU of the inventive concept. According to the definition of FIG. 12, because the upper four bits of the read data information RDI are "1000", the read data information RDI indicates that a hit occurs in the turbo write buffer TWB. Because the lower four bits are "0001", the read data information RDI indicates that the read data DT of "200" are read from the pinned turbo write buffer (TWB-p) 1222.

The host 1100 may receive the read data information RDI (="1000 0001") and may perform various memory management operations on the turbo write buffer TWB or the user storage UST.

Figure 19:
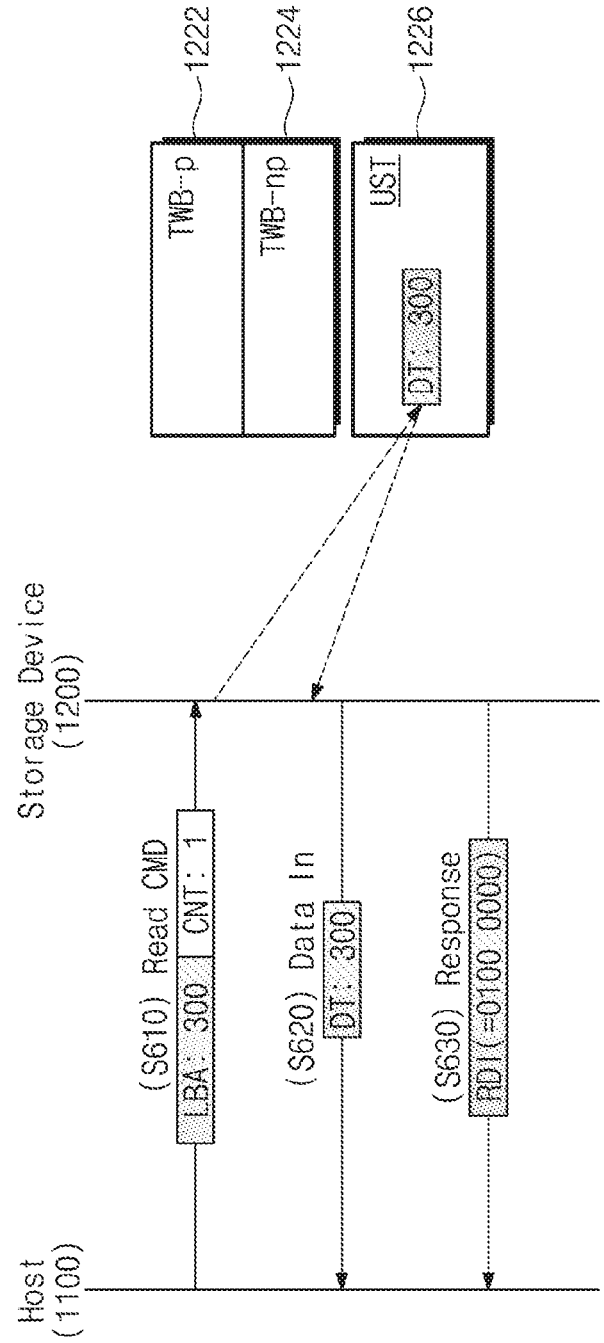
FIG. 19 illustrates an example of a miss state of read-requested data according to an exemplary embodiment of the inventive concept.

FIG. 19 illustrates an example of a miss state of read-requested data according to an exemplary embodiment of the inventive concept. FIG. 19 illustrates a case where the read-requested data are read from the user storage (UST) 1226, not the turbo write buffer TWB.

In operation S610, the host 1100 may transfer the command UPIU including the read command to the storage device 1200. It is assumed that a read address provided together with the read command includes the logical block address LBA of "300" and the count CNT of "1". The storage device 1200 may read the data DT of "300" stored in the user storage (UST) 1226 in response to the read command.

In operation S620, the storage device 1200 transfers the data DT of "300" read from the user storage (UST) 1226 to the host 1100. For example, the storage device 1200 may transfer the DATA IN UPIU packet including the read data DT of "300" to the host 1100.

In operation S630, the storage device 1200 may transfer a response to the host 1100. In this case, the storage device 1200 according to an exemplary embodiment of the inventive concept may transfer the response UPIU. In particular, the read data information RDI (="0100 0000") may be included in the response UPIU according to an exemplary embodiment of the inventive concept. According to the definition of FIG. 12, because the upper four bits of the read data information RDI are "0100", the read data information RDI (e.g., the feedback information thereof) indicates that a miss occurs in the turbo write buffer TWB. Because the lower four bits are "0000", the read data information RDI indicates that the read data DT of "300" are read from the user storage (UST) 1226. In other words, the location information of the read data information RDI indicates the user storage (UST) 1226) from which the read data DT is read.

The host 1100 may receive the read data information RDI (="0100 0000") and may perform various memory management operations on the turbo write buffer TWB or the user storage UST.

Figure 20:
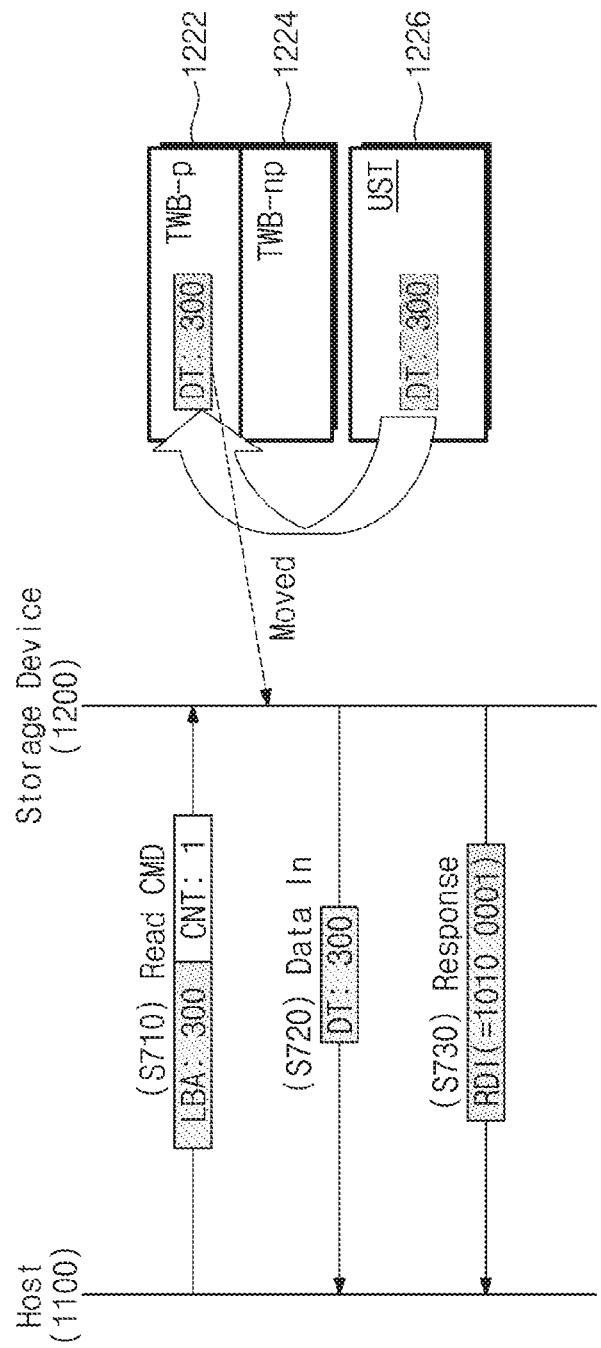
FIG. 20 illustrates an example of a moved state of read-requested data according to an exemplary embodiment of the inventive concept.

FIG. 20 illustrates an example of a moved state of read-requested data according to an exemplary embodiment of the inventive concept. FIG. 20 illustrates a case where the read-requested data are moved from the user storage (UST) 1226 to the turbo write buffer TWB through a move operation before the read operation.

In operation S710, the host 1100 may transfer the command UPIU including the read command to the storage device 1200. It is assumed that a read address provided together with the read command includes the logical block address LBA of "300" and the count CNT of "1". The read-requested data DT of "300" may be moved from the user storage (UST) 1226 to the pinned turbo write buffer (TWB-p) 1222 through a move operation. The storage device 1200 may read the read-requested data DT of "300" stored in the pinned turbo write buffer (TWB-p) 1222 in response to the read command.

In operation S720, the storage device 1200 transfers the data DT of "300" read from the pinned turbo write buffer (TWB-p) 1222 to the host 1100. For example, the storage device 1200 may transfer the DATA IN UPIU packet including the read data DT of "300" to the host 1100.

In operation S730, the storage device 1200 may transfer a response to the host 1100. In this case, the storage device 1200 according to an exemplary embodiment of the inventive concept may transfer the response UPIU. In particular, the read data information RDI (="1010 0001") may be included in the response UPIU according to an exemplary embodiment of the inventive concept. According to the definition of FIG. 12, because the upper four bits of the read data information RDI are "1010", the read data information RDI (e.g., the feedback information thereof) indicates a hit state (e.g., that a hit occurs in the pinned turbo write buffer (TWB-p) 1222) and a moved state. Because the lower four bits are "0001", the read data information RDI (e.g., the location information thereof) indicates that the read data DT of "300" are read from the pinned turbo write buffer (TWB-p) 1222.

The host 1100 may receive the read data information RDI (="1010 0001") and may perform various memory management operations on the turbo write buffer TWB or the user storage UST.

Figure 21:
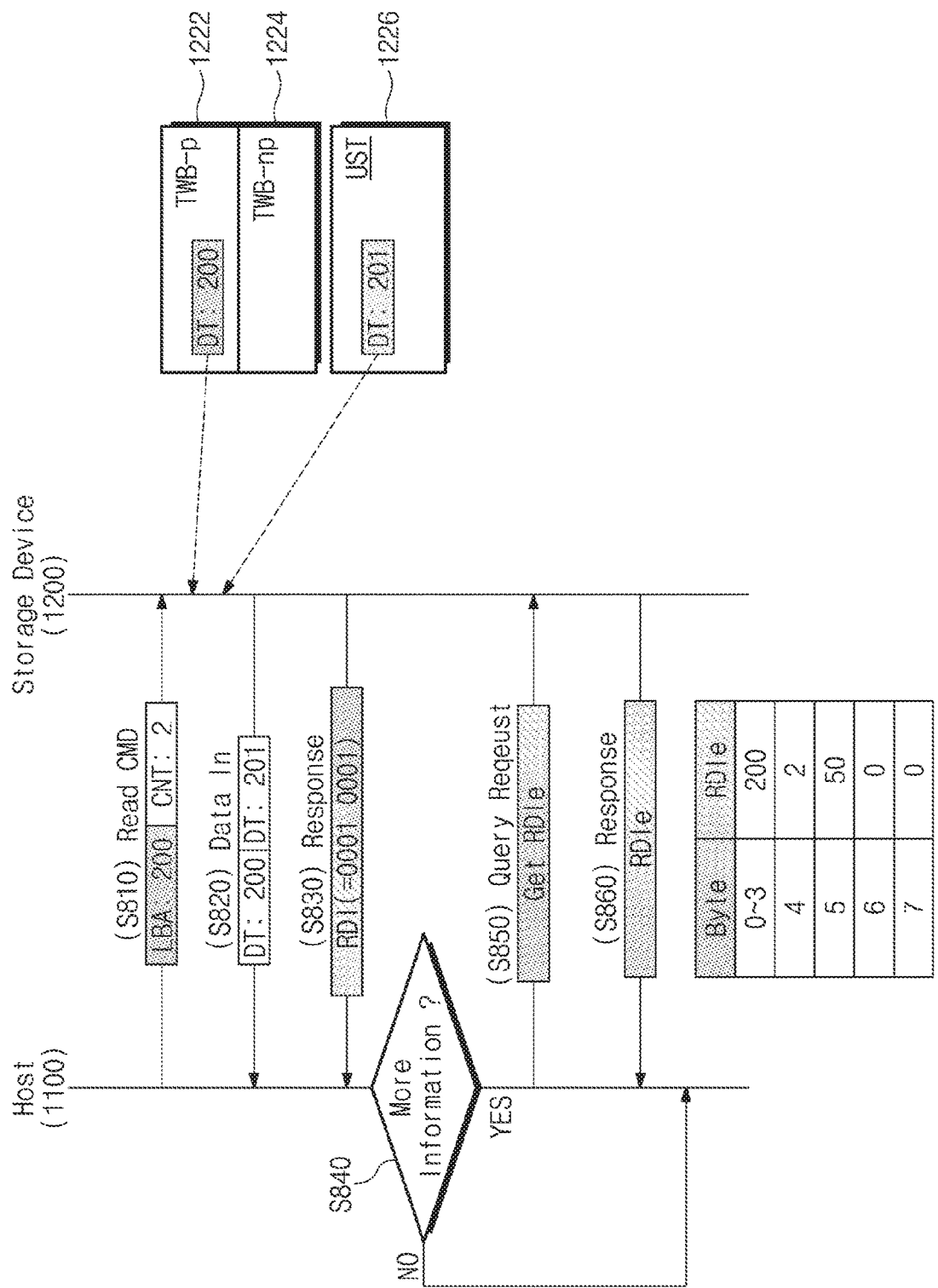
FIG. 21 illustrates an example of a partial hit state of read-requested data according to an exemplary embodiment of the inventive concept.

FIG. 21 illustrates an example of a partial hit state of read-requested data according to an exemplary embodiment of the inventive concept. Referring to FIG. 21, the host 1100 may check a partial hit and may request the extended read data information RDIe that is additional information about the read data.

In operation S810, the host 1100 may transfer the command UPIU including the read command to the storage device 1200. The host 1100 includes a read address (LBA: 200, CNT: 2) in the read command. In response to the read command, the storage device 1200 reads the data DT of "200" and "201" stored at the logical block address LBA of "200". The storage device 1200 may read the data DT of "200" stored in the pinned turbo write buffer (TWB-p) 1222 of the turbo write buffer TWB in response to the read command. The storage device 1200 may read the data DT of "201" stored in the user storage (UST) 1226 in response to the read command. In other words, the read data DT may be in a distributed state in both the pinned turbo write buffer (TWB-p) 1222 and the user storage (UST) 1226, and the read data DT is read from both the pinned turbo write buffer (TWB-p) 1222 and the user storage (UST) 1226.

In operation S820, the storage device 1200 transfers the read data DT of "200" and "201" to the host 1100. For example, the storage device 1200 may transfer at least one DATA IN UPIU packet including the read data DT of "200" and "201" to the host 1100.

In operation S830, the storage device 1200 may transfer a response to the host 1100. The storage device 1200 may transfer the response UPIU including the read data information RDI. Depending on the set attribute, information about locations of the storage device 1200, at which the read data DT of "200" and "201" are stored, and hit/miss information may be included in the read data information RDI. In the illustrated example, it is assumed that the read data information RDI has a logical value of "0001 0001". According to the bit value definition of FIG. 12, the lower four bits of the read data information RDI (e.g., the location information), that is, "0001", indicates the pinned turbo write buffer (TWB-p) 1222, and the upper four bits of the read data information RDI (e.g., the feedback information), that is, "0001", indicates a partial hit.

In operation S840, the host 1100 may check a partial hit state of the read data information RDI based on the feedback information thereof, and may determine whether additional information (e.g., extended read information RDIe) is required. When it is determined that the additional information is required (Yes), the procedure proceeds to operation S850. When it is determined that the additional information is not required (No), the procedure is terminated.

In operation S850, the host 1100 transfers the query request, for requesting the additional information of the read data corresponding to the partial hit, to the storage device 1200. For example, the host 1100 may transfer the query request for requesting the extended read data information RDIe about the read data corresponding to the partial hit.

In operation S860, the storage device 1200 may return the extended read data information RDIe for the read operation (performed from operation S810 to operation S830) to the host 1100. For example, the storage device 1200 may provide the response UPIU including the extended read data information RDIe to the host 1100. The extended read data information RDIe may be, for example, the read data attribute information about the read data DT of "200" and "201" that the host 1100 previously received.

According to the extended read data information RDIe that is illustrated, the logical block address LBA of "200" may be recorded at a field of the extended read data information RDIe corresponding to Byte 0 to Byte 3. An LBA count of "2" may be allocated to a field of the extended read data information RDI corresponding to Byte 4. A hit rate (e.g., 50%) of the pinned turbo write buffer (TWB-p) 1222 may be recorded at a field corresponding to Byte 5. Because data read from the non-pinned turbo write buffer (TWB-np) 1224 do not exist, a hit rate of 0% may be recorded at a field corresponding to Byte 6.

Figure 22:
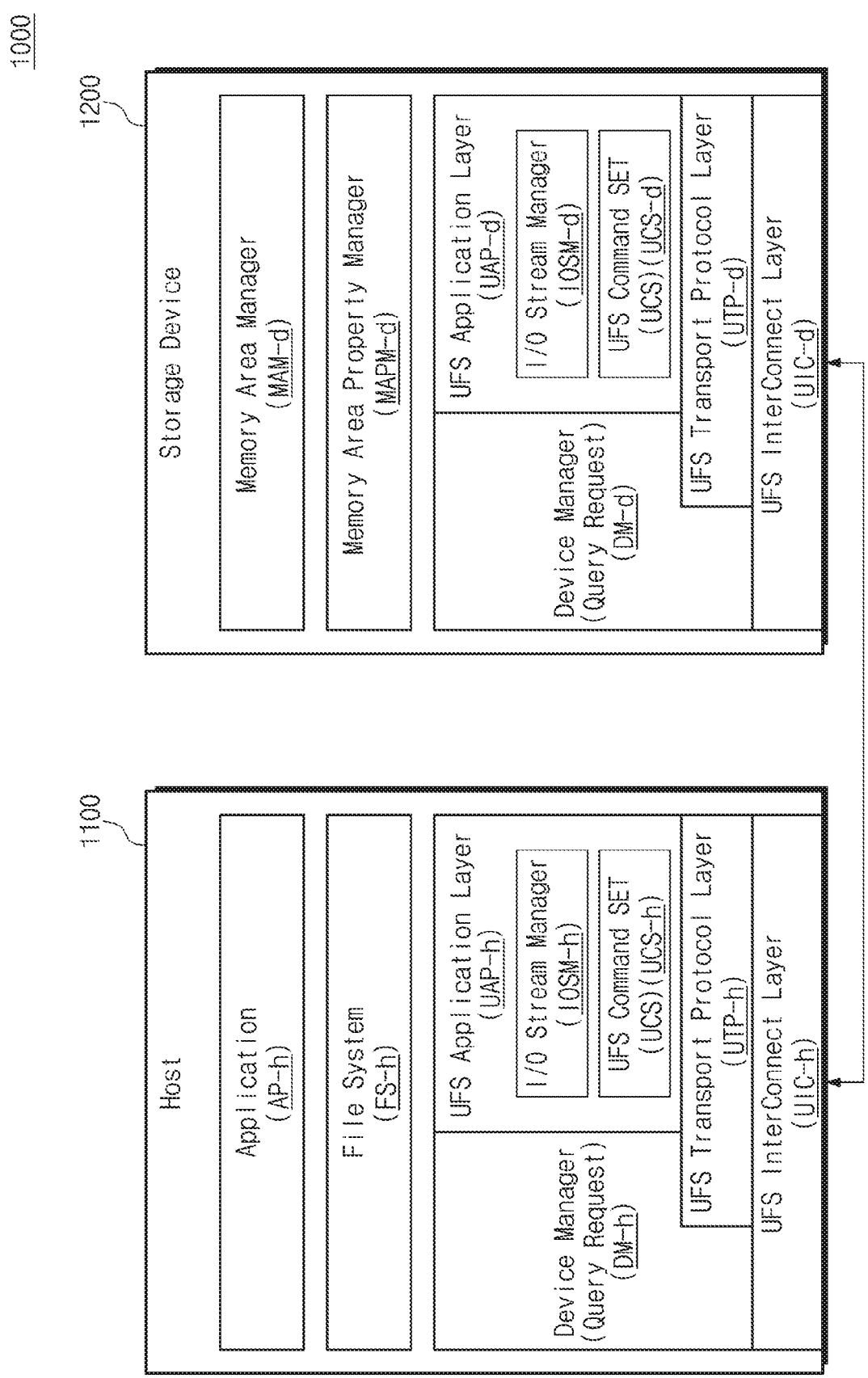
FIG. 22 is a diagram illustrating a hierarchical structure of the storage system of FIG. 1 according to an exemplary embodiment of the inventive concept.

FIG. 22 is a diagram illustrating a hierarchical structure of the storage system of FIG. 1 according to an exemplary embodiment of the inventive concept. Referring to FIG. 22, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The file system FS-h may be configured to organize and manage a variety of data generated by the application AP-h. In an exemplary embodiment of the inventive concept, the application AP-h or the file system FS-h may be configured to determine a logical block address range to specify a logical block address range for a particular area, as described with reference to FIGS. 15 to 19. Information about the determined logical block address range may be provided to a lower layer (e.g., the device manager DM-h or the UFS application layer UAP-h).

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

In an exemplary embodiment of the inventive concept, as described with reference to FIGS. 11 to 14, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set UCS-h.

In an exemplary embodiment of the inventive concept, as described with reference to FIGS. 11 to 21, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands depending on the methods described with reference to FIGS. 11 to 21.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST.

The above hierarchical structure and function of each of the host 1100 and the storage device 1200 is merely exemplary, and the inventive concept is not limited thereto.

Figure 23:
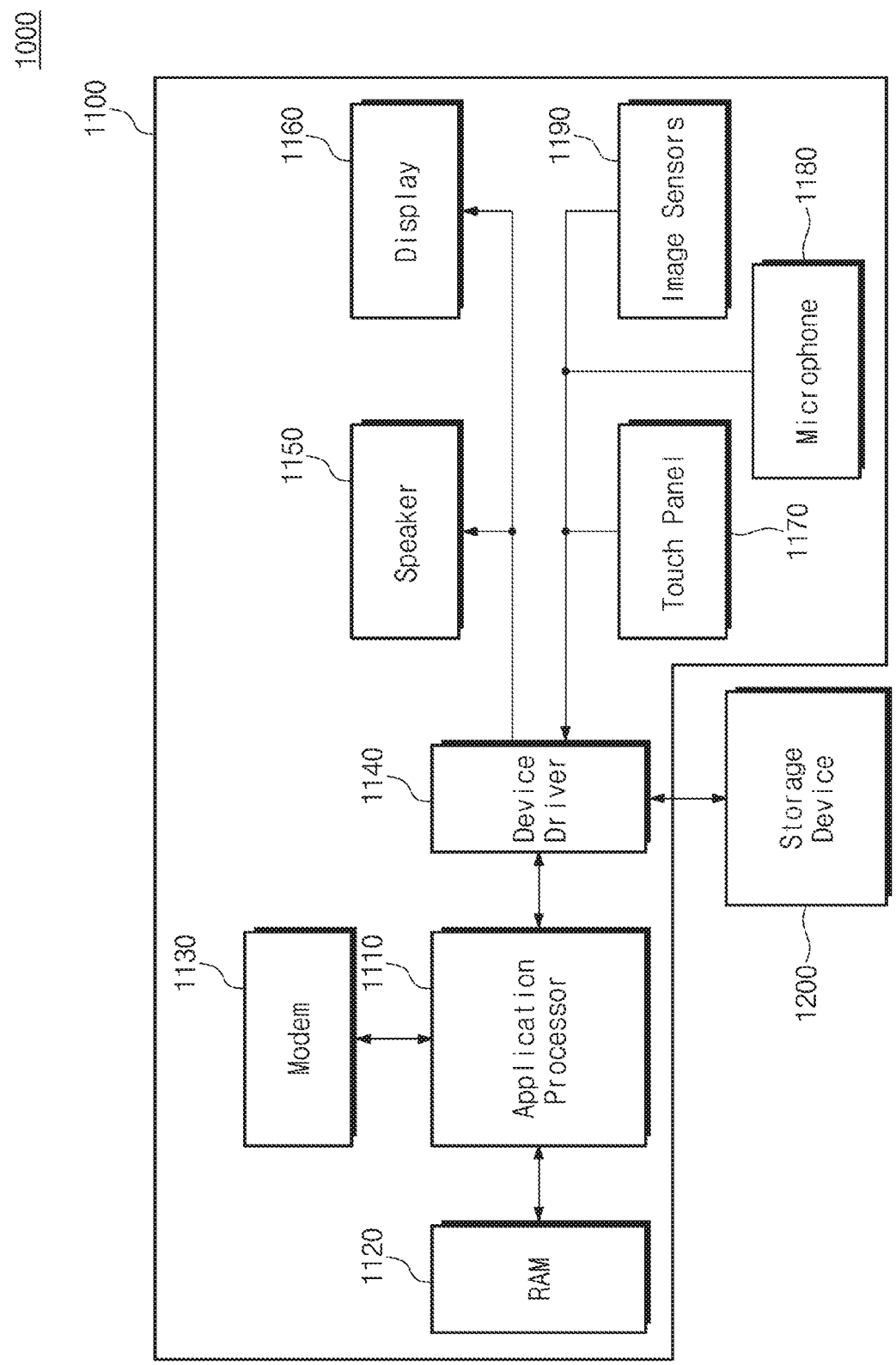
FIG. 23 is a block diagram illustrating the storage system of FIG. 1 in detail according to an exemplary embodiment of the inventive concept.

FIG. 23 is a block diagram illustrating the storage system 1000 according to an exemplary embodiment of the inventive concept in detail. Referring to FIGS. 22 and 23, the storage system 1000 may include the host 1100 and the storage device 1200. The host 1100 and the storage device 1200 may operate as described with reference to FIGS. 1 to 22.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110.

The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to the user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

Figure 24:
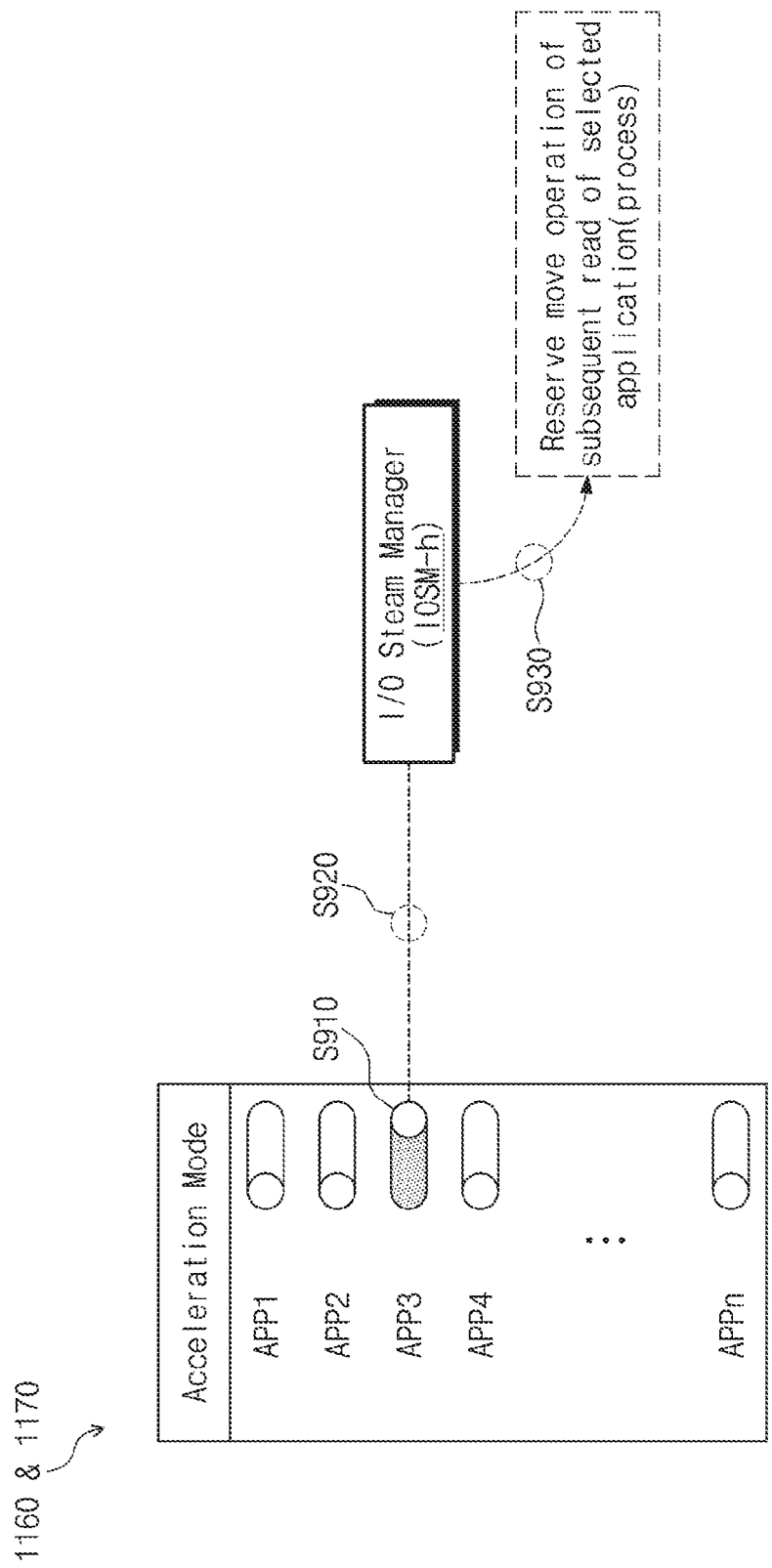
FIG. 24 illustrates a conceptual diagram in which an exemplary embodiment of the inventive concept is applied to the storage system of FIG. 1.

FIG. 24 illustrates a diagram in which an exemplary embodiment of the inventive concept is applied to the storage system 1000. Referring to FIGS. 23 and 24, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S910, the user may touch an enable location of the acceleration mode of the third application APP3. The storage system 1000 may sense a touch of the user, in other words, the directions activating the third application APP3 through the touch panel 1170. In operation S920, information of the third application APP3 or processes of the third application APP3 may be transferred to the I/O stream manager IOSM-h.

As the information of the third application APP3 or the processes of the third application APP3 are received, in operation S930, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated.

Figure 25:
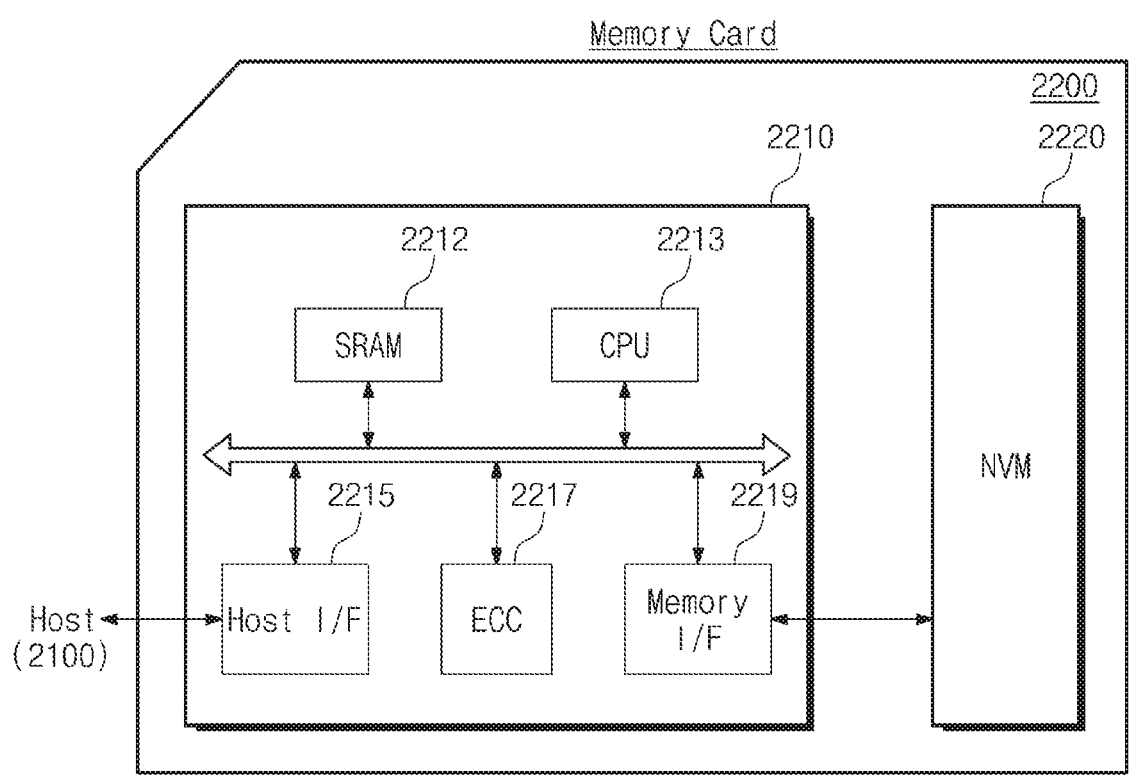
FIG. 25 is a block diagram illustrating a memory card to which a nonvolatile memory system according to exemplary embodiments of the inventive concept is applied.

FIG. 25 is a block diagram illustrating a memory card to which a nonvolatile memory system according to exemplary embodiments of the inventive concept is applied. Referring to FIG. 25, a memory card 2200 connected with a host 2100 includes a memory controller 2210 and a nonvolatile memory 2220. The memory controller 2210 is connected with the nonvolatile memory 2220. The memory controller 2210 is configured to access the nonvolatile memory 2220. For example, the memory controller 2210 is configured to control a read operation, a write operation, an erase operation, and a background operation of the nonvolatile memory 2220. The background operation includes operations such as a wear-leveling operation and a garbage collection operation.

For example, the memory controller 2210 may include an SRAM 2212, a CPU 2213, a host interface 2215, an error correction engine 2217, and a memory interface 2219. Like the memory controller 1210 described with reference to FIGS. 1 and 24, the memory controller 2210 provides read data information RDI to the host 2100.

The memory controller 2210 may communicate with an external device (e.g., the host 2100) through the host interface 2215. The memory controller 2210 may communicate with the external device (e.g., the host 2100) in compliance with a particular communication protocol. For example, the memory controller 2210 may be configured to communicate with the external device in compliance with at least one of various communication protocols such as universal serial bus (USB), multimedia card (MMC), eMMC (embedded MMC), peripheral component interconnect (PCI), PCI-express (PCI-E), advanced technology attachment (ATA), serial-ATA, parallel-ATA, small computer small interface (SCSI), enhanced small disk interface (ESDI), integrated drive electronics (IDE), FireWire, universal flash storage (UFS), or nonvolatile memory express (NVMe).

The nonvolatile memory 2220 may be implemented with various nonvolatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), or a spin-torque magnetic RAM (STT-MRAM).

For example, the memory controller 2210 and the nonvolatile memory 2220 may be integrated in a single semiconductor device. The memory controller 2210 and the nonvolatile memory 2220 may be integrated in a single semiconductor device to constitute a memory card. For example, the memory controller 2210 and the nonvolatile memory 2220 may be integrated in a single semiconductor device to constitute a memory card such as a PC card (or a personal computer memory card international association (PCMCIA) card), a compact flash card (CF), a smart media card (SM, SMC), a memory stick, a multimedia card (MMC, RS-MMC, MMCmicro, or eMMC), an SD card (SD, miniSD, microSD, or SDHC), or a universal flash storage (UFS).

Figure 26:
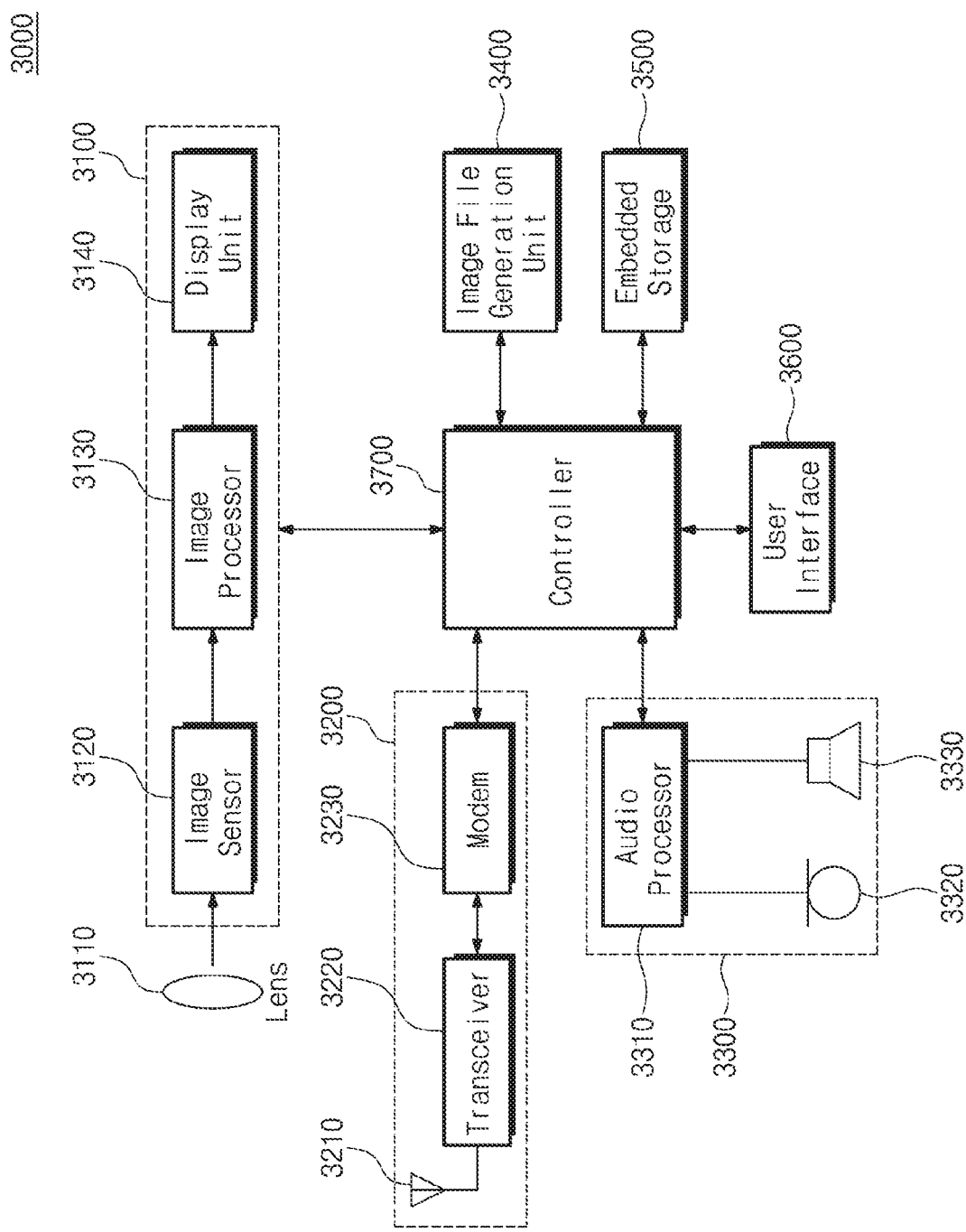
FIG. 26 is a block diagram illustrating a portable terminal including a storage device according to an exemplary embodiment of the inventive concept.

FIG. 26 is a block diagram illustrating a portable terminal including a storage device according to an exemplary embodiment of the inventive concept. Referring to FIG. 26, a portable terminal 3000 according to an exemplary embodiment of the inventive concept includes a lens 3110, an image processing unit 3100, a wireless transceiver unit 3200, an audio processing unit 3300, an image file generation unit 3400, embedded storage 3500, a user interface 3600, and a controller 3700.

The image processing unit 3100 may include an image sensor 3120 sensing a light incident through a lens 3110, an image processor 3130, and a display unit 3140. The wireless transceiver unit 3200 includes an antenna 3210, a transceiver 3220, and a modulator/demodulator (modem) 3230. The audio processing unit 3300 includes an audio processor 3310, a microphone 3320, and a speaker 3330. The image file generation unit 3400 may be a component for generating an image file within the portable terminal 3000. Here, the embedded storage 3500 may be used as storage for the portable terminal 3000. In addition, the embedded storage 3500 may include substantially the same function and configuration as the storage device 1200 described with reference to FIGS. 1 to 24.

As described above, according to exemplary embodiments of the inventive concept, a host may efficiently manage a storage device by using area information or hit/miss information of data read from the storage device that uses a turbo write buffer.

While the inventive concept has been described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A memory system comprising:
a storage device including a turbo write buffer and a user storage area implemented with a nonvolatile memory; and
a host configured to transfer a read request to the storage device, wherein, in response to the read request, the storage device transfers read data and read data information of the read data to the host,
wherein the turbo write buffer includes a first buffer area in which stored data are prohibited from moving to the user storage area, and a second buffer area in which stored data are allowed to move to the user storage area,
wherein the read data information includes location information indicating in which one of the user storage area, the first buffer area, and the second buffer area at least part of the read data is located.

2. The memory system of claim 1, wherein the read data information includes hit/miss information indicating whether the read data are present in the turbo write buffer.

3. The memory system of claim 2, wherein the hit/miss information includes move information of the read data in the storage device or partial hit information indicating a partial hit where the read data are present in the turbo write buffer and the user storage area.

4. The memory system of claim 3, wherein the storage device writes the partial hit information and an address corresponding to the partial hit information in a sense data field of a response packet, and transfers the response packet to the host.

5. The memory system of claim 3, wherein the storage device transfers read data attribute information corresponding to the partial hit to the host as a response to a query request of the host, separately from the read data information.

6. The memory system of claim 5, wherein the read data attribute information includes an address or a hit rate corresponding to the partial hit.

7. The memory system of claim 2, wherein a transfer of the hit/miss information is enabled through a query request for a set attribute by the host.

8. An operation method of a memory system which includes a turbo write buffer comprising a first buffer area and a second buffer area, and a user storage area implemented with a nonvolatile memory, the operation method comprising:
receiving a read request from a host;
reading read data from the turbo write buffer or the user storage area in response to the read request;
transferring the read data to the host by using a data transfer packet; and
transferring read data information including location information of the read data to the host indicating in which one of the user storage area, the first buffer area, and the second buffer area at least part of the read data is located,
wherein data is prohibited from moving from the first buffer area to the user storage area, and data is allowed to move from the second buffer area to the user storage area.

9. The operation method of claim 8, wherein the read data information includes information about an address at which the read data are stored.

10. The operation method of claim 9, wherein the read data information includes hit/miss information indicating whether the read data are present in the turbo write buffer.

11. The operation method of claim 10, wherein the hit/miss information includes move information of the read data in the memory system or partial hit information indicating a partial hit where the read data are present in the turbo write buffer and the user storage area in a distributed state.

12. The operation method of claim 11, further comprising:
receiving a query request for setting whether to include the hit/miss information in the read data information.

13. The operation method of claim 11, further comprising:
receiving a query request for read data attribute information, corresponding to the partial hit information, from the host; and
transferring the read data attribute information to the host in response to the query request.

14. The operation method of claim 13, wherein the read data attribute information includes a hit rate of the read data in the turbo write buffer.

* * * * *